(12) United States Patent
Bordes et al.

(10) Patent No.: US 12,713,056 B2
(45) Date of Patent: Aug. 18, 2026

(54) LOCAL ILLUMINATION COMPENSATION FOR VIDEO ENCODING OR DECODING

(71) Applicant: InterDigital Madison Patent Holdings, SAS, Paris (FR)

(72) Inventors: Philippe Bordes, Laille (FR); Franck Galpin, Thorigne-Fouillard (FR); Fabrice Urban, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 18/625,733

(22) Filed: Apr. 3, 2024

(65) Prior Publication Data

US 2024/0283967 A1 Aug. 22, 2024

Related U.S. Application Data

(63) Continuation of application No. 17/436,922, filed as application No. PCT/US2020/021098 on Mar. 5, 2020, now Pat. No. 11,997,308.

(30) Foreign Application Priority Data

Mar. 8, 2019 (EP) .................................... 19305269
Mar. 8, 2019 (EP) .................................... 19305270
(Continued)

(51) Int. Cl.
*H04N 7/12* (2006.01)
*H04N 19/105* (2014.01)
(Continued)

(52) U.S. Cl.
CPC ........... *H04N 19/52* (2014.11); *H04N 19/105* (2014.11); *H04N 19/132* (2014.11);
(Continued)

(58) Field of Classification Search
CPC .... H04N 19/52; H04N 19/105; H04N 19/132; H04N 19/139; H04N 19/159;
(Continued)

(56) References Cited

U.S. PATENT DOCUMENTS 10,110,914 B1 10/2018 Chen et al.
10,200,719 B2 2/2019 Zhang et al.
(Continued)

FOREIGN PATENT DOCUMENTS

CN 101193302 A 6/2008
CN 108293137 A 7/2018
(Continued)

OTHER PUBLICATIONS

Bordes, et al., "Non-CE1: Simplification of LIC Parameters Derivation", Technicolor, Joint Video Experts Team(JVET) of ITU-T SG 16 WP 3 and ISO/IEC JTC 1/SC 29/WG 11, JVET-N0306, 14th Meeting, Geneva, CH, Mar. 19-27, 2019, 3 pages.
(Continued)

*Primary Examiner* — Gims S Philippe
(74) *Attorney, Agent, or Firm* — Condo Roccia Koptiw LLP

(57) ABSTRACT

Described are methods and apparatuses for encoding/decoding a picture comprising predicting at least one block, wherein the predicting comprises performing motion compensation and local illumination compensation based on a reference block, the local illumination compensation including applying a linear model based on sums of absolute differences of neighboring reconstructed samples and corresponding reference samples of the reference block, wherein the neighboring reconstructed samples and corresponding reference samples of the reference block are co-located according to an L-shape substantially adjacent to the block to be predicted, the L-shape comprising a row of
(Continued)

pixels located to the top side of the predicted block and a column of pixels located to the left side of the predicted block, the co-location being determined according a motion vector of the predicted block.

28 Claims, 15 Drawing Sheets

(30) Foreign Application Priority Data

Mar. 8, 2019 (EP) .................................... 19305274
May 6, 2019 (EP) .................................... 19305573

(51) Int. Cl.
*H04N 19/132* (2014.01)
*H04N 19/139* (2014.01)
*H04N 19/159* (2014.01)
*H04N 19/172* (2014.01)
*H04N 19/176* (2014.01)
*H04N 19/182* (2014.01)
*H04N 19/196* (2014.01)
*H04N 19/52* (2014.01)

(52) U.S. Cl.
CPC ......... *H04N 19/139* (2014.11); *H04N 19/159* (2014.11); *H04N 19/172* (2014.11); *H04N 19/176* (2014.11); *H04N 19/182* (2014.11); *H04N 19/196* (2014.11)

(58) Field of Classification Search
CPC .. H04N 19/172; H04N 19/176; H04N 19/182; H04N 19/196; H04N 19/42; H04N 19/82
See application file for complete search history.

(56) References Cited

U.S. PATENT DOCUMENTS

2008/0130750 A1 6/2008 Song
2015/0195562 A1* 7/2015 Li ........................ H04N 19/109 375/240.16
2015/0271524 A1 9/2015 Zhang et al.
2017/0150156 A1 5/2017 Zhang et al.
2018/0048895 A1* 2/2018 Jeon ..................... H04N 19/167
2018/0063531 A1* 3/2018 Hu ......................... H04N 19/42
2018/0098086 A1 4/2018 Chuang et al.
2018/0098087 A1 4/2018 Li et al.
2018/0109790 A1 4/2018 Ikai
2019/0110058 A1 4/2019 Chien et al.
2020/0186830 A1* 6/2020 Seregin ................ H04N 19/186
2020/0252653 A1 8/2020 Rusanovskyy et al.
2020/0260119 A1* 8/2020 Esenlik .................. H04N 19/70
2021/0051345 A1* 2/2021 Tsai ....................... H04N 19/52
2021/0076059 A1* 3/2021 Sethuraman ......... H04N 19/523
2021/0321097 A1* 10/2021 Zhao ...................... H04N 19/11
2022/0248064 A1 8/2022 Tsai et al.

FOREIGN PATENT DOCUMENTS

EP 2398241 A1 12/2011
KR 20080094048 A 10/2008

OTHER PUBLICATIONS

Bossen, et al., “AHG report: Test model software development (AHGS)”, Joint Video Experis Team WIVET) of ITU-T SG 16 WP 3 and ISO/IEC JTC 1/SC 29/WG 11, Document JVET-M0003-v2, 13th Meeting: Marrakech, Morocco, Jan. 9, 2019, 6 pages.

Chen, Jianle et al., “Algorithm Description for Versatile Video Coding and Test Model 4 (VTM 4)”, JVET-M1002-V2, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 62 pages.

Chen, Jianle et al., “Algorithm Description of Joint Exploration Test Model 7 (JEM 7)”, Joint Video Exploration Team (JVET) of ITU-T SG 16 WP 3 and ISO/IEC JTC 1/SC 29/WG 11, 7th Meeting: Torino, IT; Editors; JVET-G1001-V1, Jul. 13-21, 2017, 48 pages.

Dodge, Yadolah, “The Concise Encyclopedia of Statistics”, URL:http://www.stewartschultz.com/statistics/books/The%20Concise%20Encyclopedia%20of%20Statistics.pdf, Jan. 1, 2008, pp. 299-307.

Filippov, et al., “CE1-Related: Simplified and Robust LIC Parameter Derivation Unified with CCLM”, Joint Video Experts Team (JVET) of ITU-T SG16 WP 3 and ISO/IEC JTC 1/SC 29/WG 11, Document JVET-N0176-v3, 14th Meeting: Geneva, CH, Mar. 19-27, 2019, 8 pages.

Gisquet, et al., “Non-CE3: LM in the Middle”, Joint Video Experts Team (JVET) af ITU-T SG 16 WP 3 and ISO/IEC JTS 1/SC 29/WG 11; Document JVET-MO384, 13th Meeting: Marrakech, Morroco, Jan. 9, 2019, 3 pages.

Houck, et al., “Using Absolute Deviations to Compute Lines of Best Fit”, URL:https://ageconsearch.umn.edu/record/13732/files/p68-02.pdf, Oct. 1968, pp. 1-10.

Hu, Nan et al., “Unification of Parameter Derivation for CCLM and LIC”, Joint Video Exploration Team (JVET) of ITU-T SG 16 WP 3 and ISO/IEC JTC 1/SC 29/WG 11; 4th Meeting: Chengdu, CN; JVET-D0122_v2, Oct. 15-21, 2016, 6 pages.

ITU-T, “Reference Software for ITU-T H.265 High Efficiency Video Coding”, Recommendation ITU-T H.265.2, Series H: Audiovisual and Multimedia Systems, Infrastructure of Audiovisual Services—Coding of Moving Video, Oct. 2014, 12 pages.

Ma, et al., “CE3-related: Classification-based mean value for CCLM coefficients derivation”, Joint Video Experts Team (JVET) of ITU-T SG 16 WP 3 and 1SGO/IEC JTC 1/SC 29/WG 11, Document: JVET-L0342-r2 , 12th Meeting: Macao, China, Oct. 3, 2018, 5 pages.

Ramasubramonian, et al., “CE3: On MMLM (Test 2.1)”, Qualcomm Inc., Joint Video Experts Team (JVET) of (ITU-T SG 16 WP 3 and ISO/IEC JTC 1/SC 29/WG 11, Document: JVET-M0097-v1, 13 Meeting: Marrakech, MA, Jan. 9-18, 2019, pp. 1-4.

Ström, et al., “Description of Core Experiment 1 (CE1): Post-prediction and Post-reconstruction Filtering”, CE1 Coordinators, Joint Video Experts Team (JVET) of ITU-T SG 16 WP 3 and ISO/IEC JTC 1/SC 29/WG 11, Document JVET-M1021_v7, 13th Meeting: Marrakech, MA, Jan. 9-18, 2019, 10 pages.

Wikipedia, “Least Absolute Deviations”, URL: https://en.wikipedia.org/w/index.php?title=Least_absolute_deviations&oldid=884427031, Feb. 21, 2019, pp. 1-6.

Wikipedia, “Simple Linear Regression”, URL: https://en.wikipedia.org/wiki/Simple_linear_regression, Sep. 1, 2005, 8 pages.

Wikipedia, “Tikhonov Regularization”, https-//en.wikipedia.org/w/index.php?title=Tikhonov_regularization&oldid=221699702, Jun. 25, 2008, 4 pages.

Wilson, Hoyt G, “Least Squares Versus Minimum Absolute Deviations Estimation in Linear Models”, Decision Sciences, vol. 9, No. 2, Apr. 1978, pp. 322-335.

Yasugi, et al., “Non-CE3: CCLM Table Reduction and Bit Range Control”, Joint Video Experts Team GIVET) of ITU-T SG 16 WP3 and ISOHEC JTC 1/8G 29/WG 17, Document JVET-M0064, 13 Meeting: Marrakech, Morocco, Jan. 9, 2019, 5 pages.

Zhang, et al., “EE5: Enhanced Cross-component Linear Model Intra-prediction”, Qualcomm Incorporated, Joint Video Exploration Team, (JVET) of ITU-T SG 16 WP 3 and ISO/IEC JTC 1/SC 29WG 11, Document: JVET-E0077, 5th Meeting, Geneva, CH, Jan. 12-20, 2017, 4 pages.

Zhang, et al., “Enhanced Cross-component Linear Model Intra-prediction”, Qualcomm Incorporated, Joint Video Exploration Team (JVET) of ITU-T SG 16 WP 3 and ISO/IEC JTC 1/SC 29/WG 17, Document: JVET-DO110, 4th Meeting: Chengdu, China, Oct. 15-21, 2016, 5 pages.

* cited by examiner

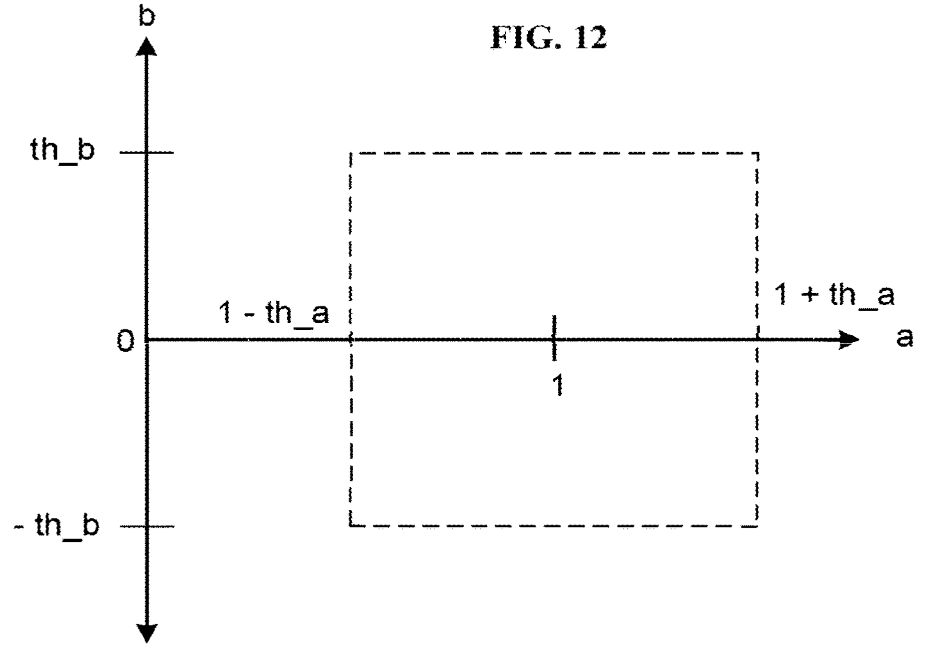
FIG. 12
FIG13
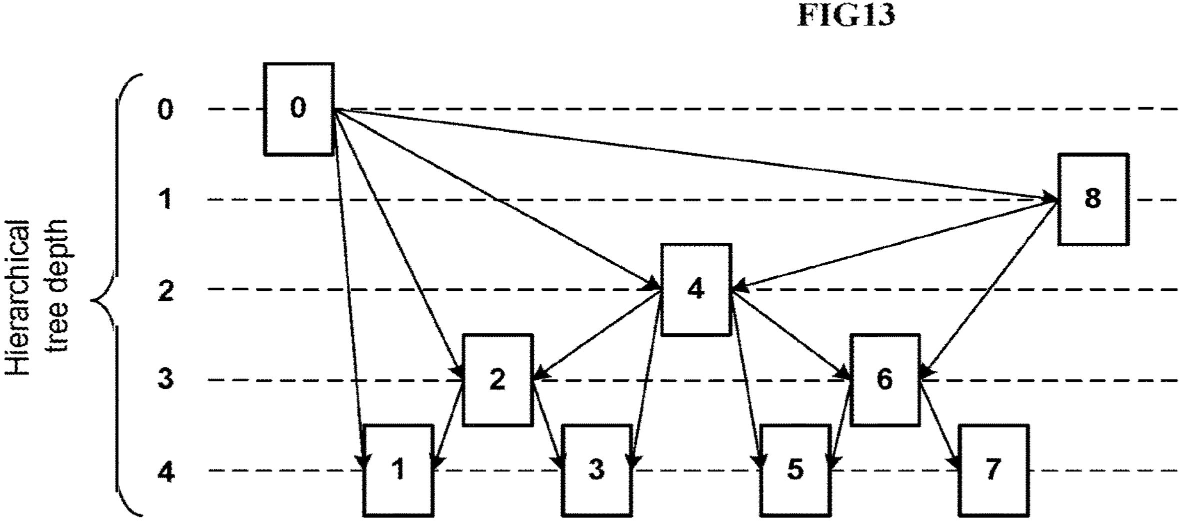

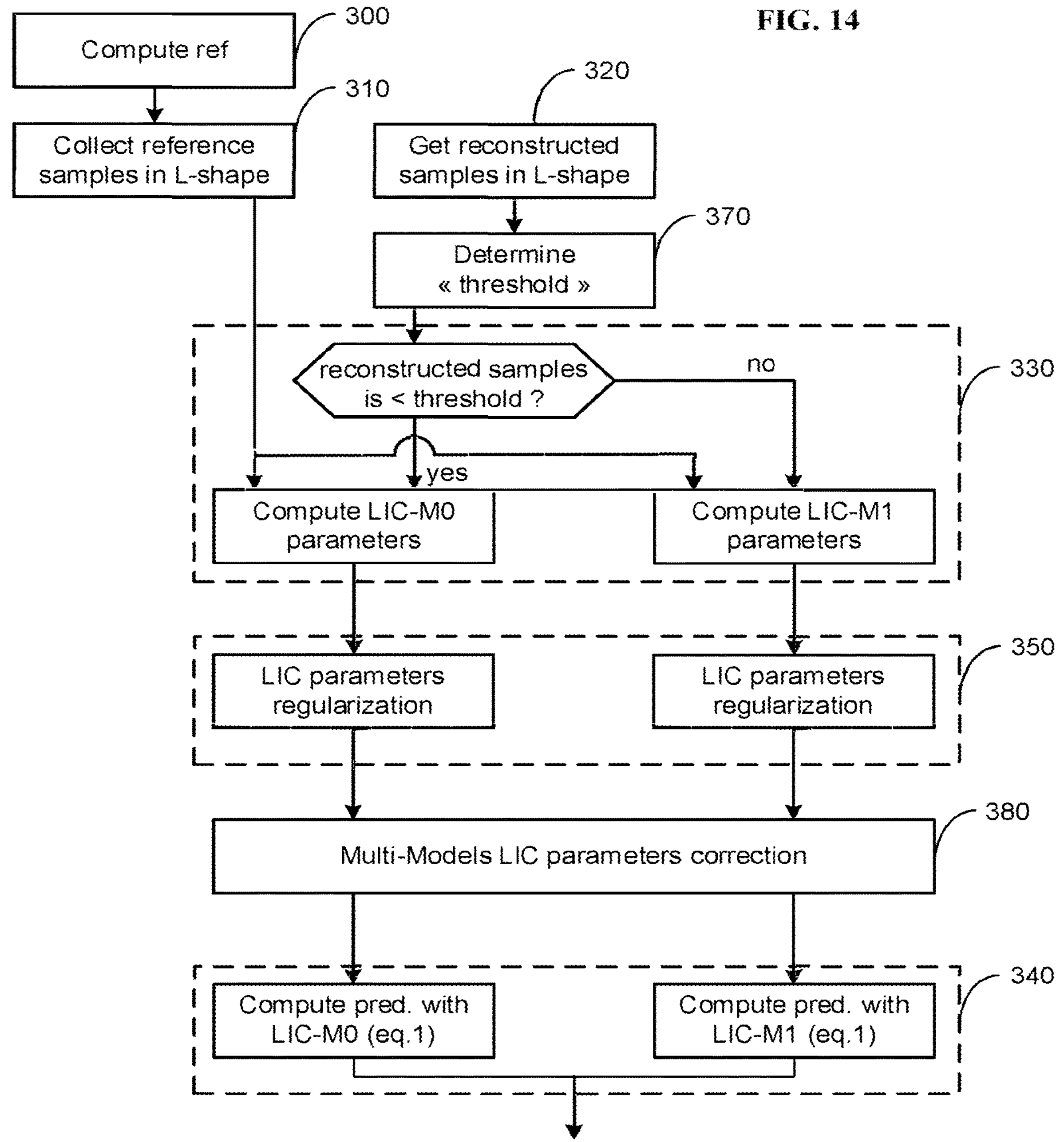
FIG. 14
300
Compute ref
310
Collect reference samples in L-shape
320
Get reconstructed samples in L-shape
370
Determine « threshold »
330
reconstructed samples is < threshold ?
no
yes
Compute LIC-M0 parameters
Compute LIC-M1 parameters
350
LIC parameters regularization
LIC parameters regularization
380
Multi-Models LIC parameters correction
340
Compute pred. with LIC-M0 (eq.1)
Compute pred. with LIC-M1 (eq.1)

Compute LIC-M0 parameters
Compute LIC-M1 parameters

380
Compute Discontinuity between the two models
381
382
DS > TD ?
no
383
yes
Correction of LIC-M0 and LIC-M1
340
Compute pred. with LIC-M0 (eq.1)
Compute pred. with LIC-M1 (eq.1)
Nb samples
$N_{M0}$
$N_{M1}$
n(h)

h=0
h=1
samples values
Min range
Histogram step
threshold
Max range

Compute ref
300
Collect reference samples in L-shape
310
Get reconstructed samples in L-shape
320
Determine « threshold »
370
reconstructed samples is < threshold ?
331
no
yes
330
Compute LIC-M0 parameters (eq.4)
332
Compute LIC-M1 parameters (eq.4)
333
Compute pred0. with LIC-M0 (eq.1)
Compute pred1. with LIC-M1 (eq.1)
340
Combine pred0 and pred1
360

LOCAL ILLUMINATION COMPENSATION FOR VIDEO ENCODING OR DECODING

CROSS REFERENCE TO RELATED APPLICATIONS

This application is a continuation of U.S. Ser. No. 17/436,922 (now U.S. Pat. No. 11,997,308), which is the National Stage Entry under 35 U.S.C. § 371 of Patent Cooperation Treaty Application No. PCT/US2020/021098, filed Mar. 5, 2020, which claims priority from European Patent Application No. 19305274.3, filed Mar. 8, 2019, European Patent Application No. 19305270.1, filed Mar. 8, 2019, European Patent Application No. 19305269.3, filed Mar. 8, 2019, and European Patent Application No. 19305573.8, filed May 6, 2019, the contents of each of which are hereby incorporated by reference herein in their entireties.

TECHNICAL FIELD

At least one of the present embodiments generally relates to local illumination compensation for video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments provide a method and apparatus for encoding/decoding a picture using Local Illumination Compensation (LIC) parameters computed using a derivation that provides reduced complexity and thus, improves the performances of the LIC related processes.

According to a first aspect of at least one embodiment, a video encoding method comprises predicting picture data for at least one block in a picture, wherein the predicting comprises performing motion compensation and local illumination compensation based on a reference block, the local illumination compensation including applying a linear model based on sums of absolute differences of neighboring reconstructed samples and corresponding reference samples of the reference block, wherein the neighboring reconstructed samples and corresponding reference samples of the reference block are co-located according to an L-shape substantially adjacent to the block to be predicted, the L-Shape comprising a row of pixels located to the top side of the predicted block and a column of pixels located to the left side of the predicted block, the co-location being determined according a motion vector of the predicted block.

According to a second aspect of at least one embodiment, a video decoding method comprises predicting picture data for at least one block in a picture, wherein the predicting comprises performing motion compensation and local illumination compensation based on a reference block, the local illumination compensation including applying a linear model based on sums of absolute differences of neighboring reconstructed samples and corresponding reference samples of the reference block, wherein the neighboring reconstructed samples and corresponding reference samples of the reference block are co-located according to an L-shape substantially adjacent to the block to be predicted, the L-Shape comprising a row of pixels located to the top side of the predicted block and a column of pixels located to the left side of the predicted block, the co-location being determined according a motion vector of the predicted block.

According to a third aspect of at least one embodiment, an apparatus, comprises an encoder for encoding picture data for at least one block in a picture or video wherein the encoder is configured to predict picture data for at least one block in a picture, wherein the predicting comprises performing motion compensation and local illumination compensation based on a reference block, the local illumination compensation including applying a linear model based on sums of absolute differences of neighboring reconstructed samples and corresponding reference samples of the reference block, wherein the neighboring reconstructed samples and corresponding reference samples of the reference block are co-located according to an L-shape substantially adjacent to the block to be predicted, the L-Shape comprising a row of pixels located to the top side of the predicted block and a column of pixels located to the left side of the predicted block, the co-location being determined according a motion vector of the predicted block.

According to a fourth aspect of at least one embodiment, an apparatus, comprises a decoder for decoding picture data for at least one block in a picture or video wherein the decoder is configured to predict picture data for at least one block in a picture, wherein the predicting performing motion compensation and local illumination compensation based on a reference block, the local illumination compensation including applying a linear model based on sums of absolute differences of neighboring reconstructed samples and corresponding reference samples of the reference block, wherein the neighboring reconstructed samples and corresponding reference samples of the reference block are co-located according to an L-shape substantially adjacent to the block to be predicted, the L-Shape comprising a row of pixels located to the top side of the predicted block and a column of pixels located to the left side of the predicted block, the co-location being determined according a motion vector of the predicted block.

According to a variant aspect of the first, second, third and fourth aspect, the parameters of the linear model are computed by:

$$a = \left( \frac{\sum \text{abs}\left( cur(r) - \frac{\sum cur(r)}{N} \right)}{\sum \text{abs}\left( ref(s) - \frac{\sum ref(s)}{N} \right)} \right)$$

$$b = \frac{\sum cur(r)}{N} - a \times \frac{\sum ref(s)}{N}$$

wherein cur(r) is a neighboring reconstructed sample in a current picture, ref(s) is a reference sample built with motion compensation translated by a motion vector mv from a reference picture, and s=r+mv.

According to a variant aspect of the first, second, third and fourth aspect, the parameters "a" is derived with an additional simple regularization term "corr" and determined by:

$$a = \left( \frac{\sum \text{abs}\left( cur(r) - \frac{\sum cur(r)}{N} \right) + \text{corr}}{\sum \text{abs}\left( ref(s) - \frac{\sum ref(s)}{N} \right) + \text{corr}} \right)$$

wherein $$\text{corr} = \left( \sum \text{abs}\left( cur(r) - \frac{\sum cur(r)}{N} \right) \right) >> \text{reg\_shift}$$

and reg_shift=7 for example.

According to a fifth aspect of at least one embodiment, a computer program comprising program code instructions executable by a processor is presented, the computer program implementing the steps of a method according to at least the first or second aspect.

According to an sixth aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 12 illustrates a regularization function where the parameters are adjusted when being outside a given range.

FIG. 13 shows the temporal depth that is related to the hierarchical picture coding principles.

FIG. 14 illustrates an example embodiment of regularization to handle multi-model LIC.

DETAILED DESCRIPTION

In at least one embodiment, the video encoding or decoding uses LIC and the computation of the LIC parameters is simplified by reducing its complexity, resulting into an improvement of video encoding or decoding performances.

In at least one embodiment, the video encoding or decoding uses LIC that uses at least one linear model whose parameters are determined using a derivation process that comprises a regularization process to improve the estimation of the local illumination change and a correction process to prevent discontinuity issues when using multiple linear models. Thus, visual artefacts are prevented.

Figure 1:
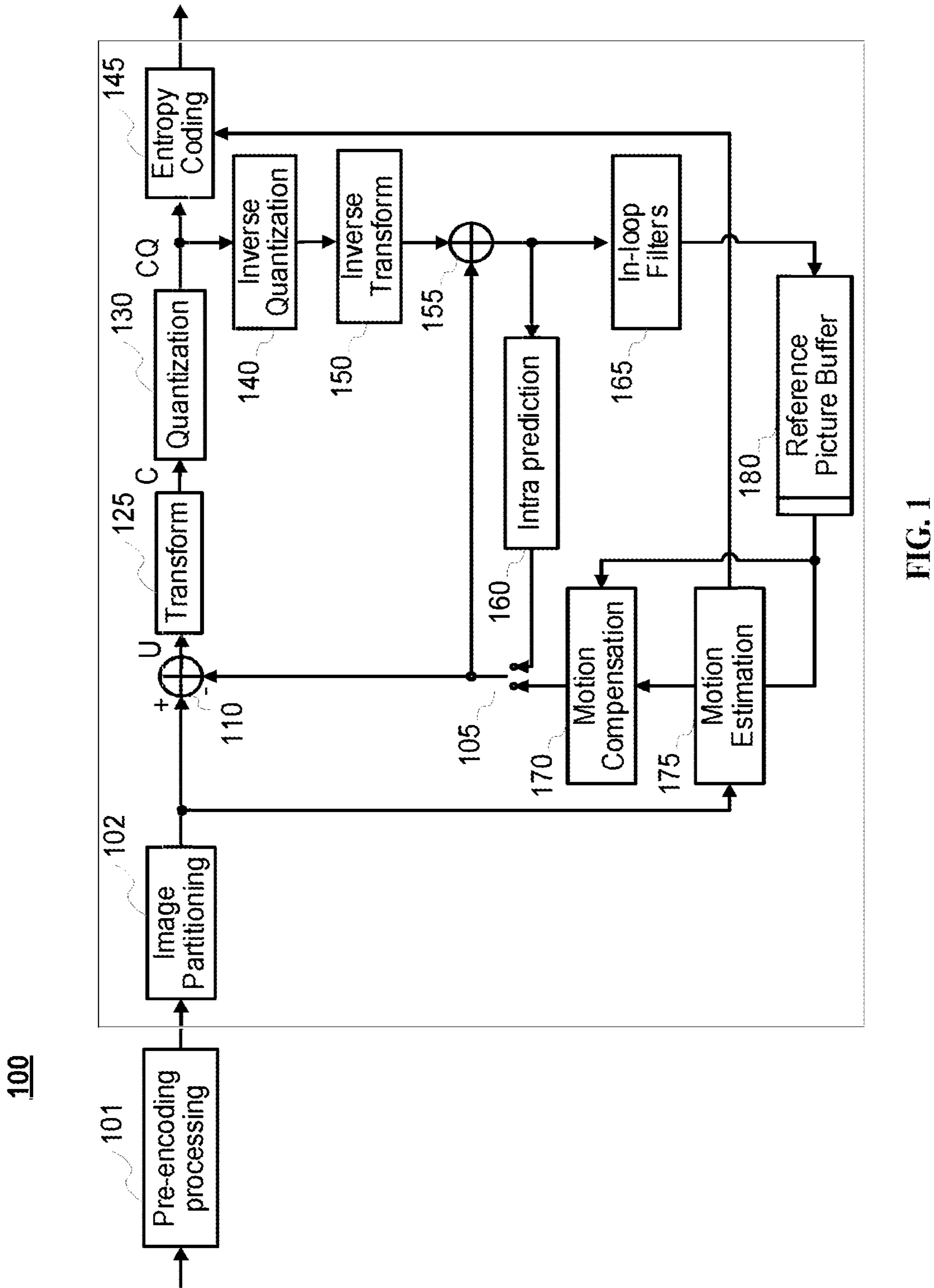
FIG. 1 illustrates a block diagram of an example of video encoder 100, such as a High Efficiency Video Coding (HEVC) encoder.

FIG. 1 illustrates block diagram of an example of video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
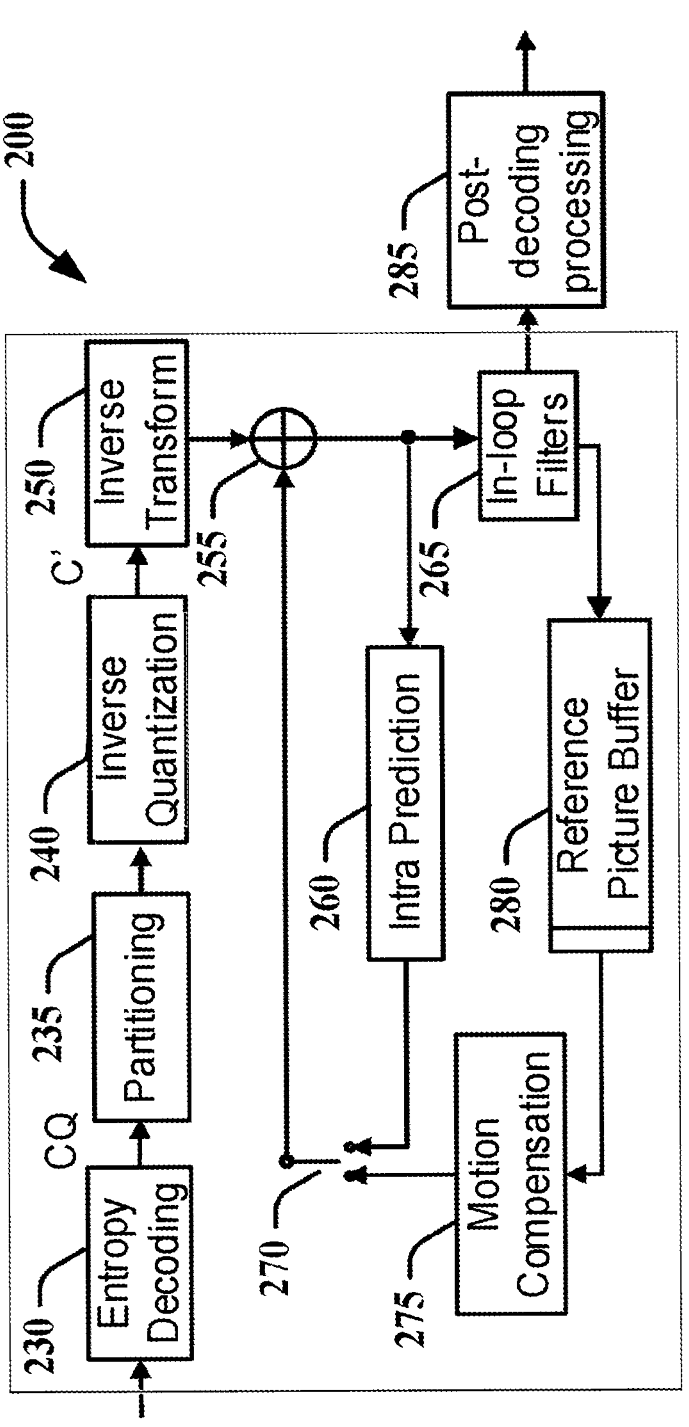
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
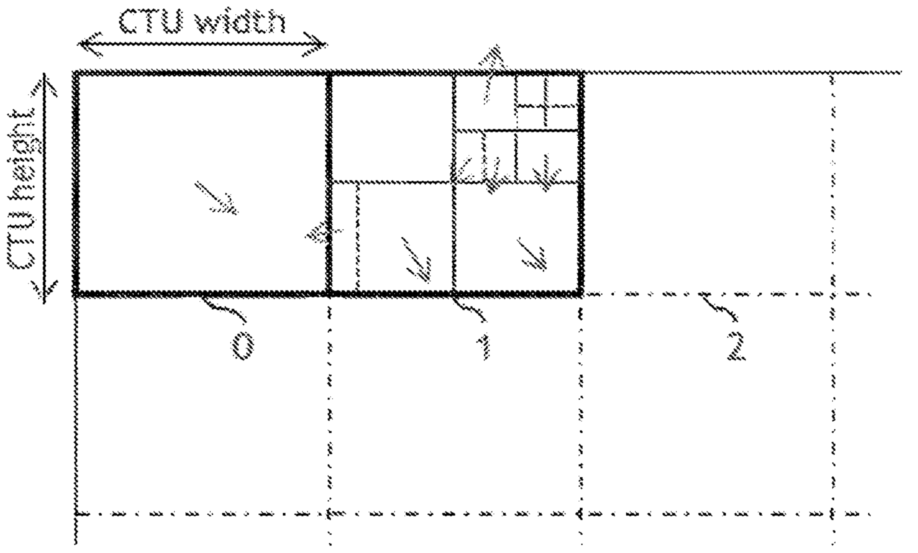
FIG. 3 illustrates an example of coding tree unit and coding tree in the compressed domain.

FIG. 3 illustrates an example of coding tree unit and coding tree in the compressed domain. In the HEVC video compression standard, a picture is partitioned into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU).

Figure 4:
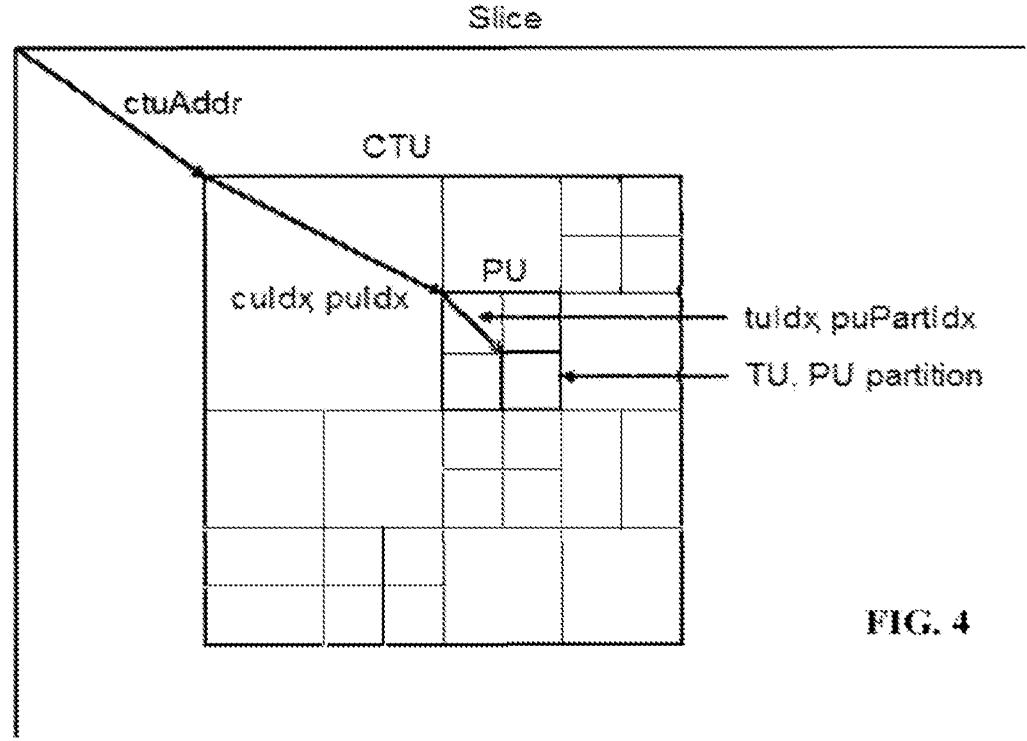
FIG. 4 illustrates an example of division of a CTU into coding units, prediction units and transform units.

FIG. 4 illustrates an example of division of a CTU into coding units, prediction units and transform units. Each CU is then given some Intra or Inter prediction parameters Prediction Info). To do so, it is spatially partitioned into one or more Prediction Units (PUs), each PU being assigned some prediction information. The Intra or Inter coding mode is assigned on the CU level.

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side. The term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

Figure 5:
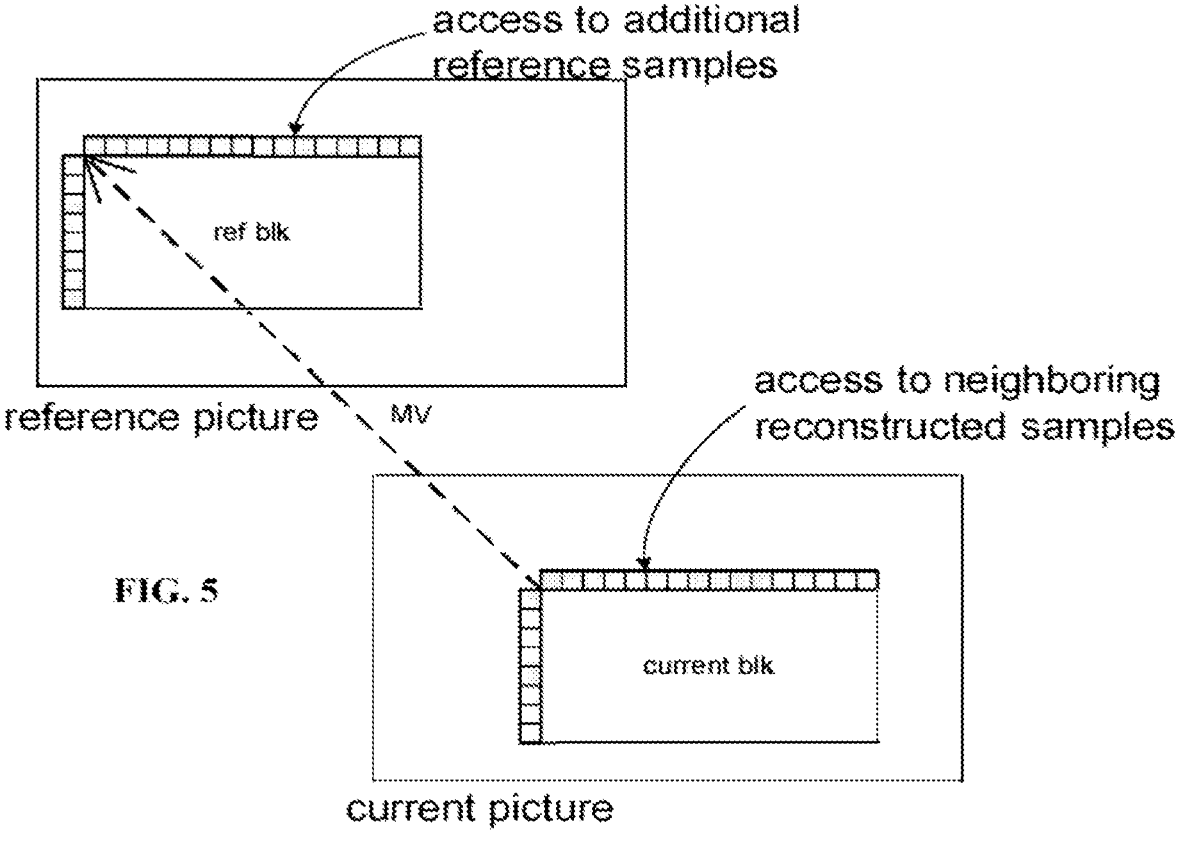
FIG. 5 illustrates an example of "L-shape" used for local illumination compensation.

FIG. 5 illustrates an example of "L-shape" used for local illumination compensation. Indeed, new emerging video compression tools, as studied in the Joint Exploration Model (JEM) and in the Versatile Video Coding reference software [2] developed by the JVET (Joint Video Exploration Team) group, use some additional temporal prediction tools with associated parameters determined at the decoder side, such as Local Illumination Compensation (LIC).

Basically, the purpose of LIC is to compensate for illumination change which may occur between a predicted block and its reference block employed through motion compensated temporal prediction. The use of LIC is typically signaled on the CU level, through a flag (LIC flag) associated to each coding unit (CU) coded in inter mode, or inferred from previously decoded blocks if current CU is coded in merge mode for instance. When this tool is activated, the decoder computes some prediction parameters based on some reconstructed picture samples, localized on the left and/or on the top of the current block to be predicted and reference picture samples localized on the left and/or on the top of the motion compensated block (FIG. 5). In the considered prior art codec (JEM), the use of LIC for a given block depends on a flag associated to this block, called the LIC flag.

In the following, we will call "L-shape" associated to the current block, the set composed of the samples situated on the row above the current block and of the samples situated on the column at the left of the current block, as depicted in grey in FIG. 5. In a variant, more than one row (one column resp.) may be used.

A first implementation of LIC uses a LIC model based on a simple linear correction of equation 1 that is applied on the regular current block prediction:

$$Y\mathrm{corr}(x) = a \cdot Ypred(x) + b \qquad \text{(Eq. 1)}$$

where Ypred(x) is the prediction sample value situated at position x, Ycorr(x) is the illumination compensated prediction sample value situated at position x, and (a,b) are the LIC parameters.

The LIC parameters (a,b) are weight and offset based on the minimization of an error between current samples and linearly modified reference samples, which is defined as follows in equation 2:

$$dist = \sum\nolimits_{r \in Vcur, s \in V_{ref}} (cur(r) - a \cdot ref(s) - b)^2 \qquad \text{(Eq. 2)}$$

where:

cur(r) is a neighboring reconstructed sample in current picture (right side of FIG. 5), ref(s) is a reference sample built with MC from reference picture (left side of FIG. 5), with s=r+mv, cur(r) and ref(r) are co-located samples in the reconstructed and reference L-shape respectively.

The value of (a,b) are obtained using a least square minimization (LSM) as formulated in equation 3 as follows:

$$a = \left( \frac{\sum ref(s) \times cur(r) - \frac{\sum ref(s) \times \sum cur(r)}{N}}{\sum cur(r)^2 - \frac{\sum ref(s) \times \sum ref(s)}{N}} \right) \qquad \text{(Eq. 3)}$$

$$b = \frac{\sum cur(r)}{N} - a \times \frac{\sum ref(s)}{N}$$

Note that the value of N may be furtherly adjusted (reduced incrementally) in order to the sum terms in eq.3 to remain below the maximum integer storage number value allowed (e.g. sum term $<2^{16}$). Also, the sub-sampling of the top and left samples set can be incremented for large blocks.

In case of additional condition for selecting the reconstructed samples, N can be equal to "numValid", or non-valid samples may be replaced with copied valid samples.

The value of (a,b) can for example be obtained using simpler computation than a least square minimization, for example using extreme values.

Once the LIC parameters (a, b) are obtained by the encoder or the decoder for the current CU, then the prediction of current CU consists in the following (uni-directional prediction case):

$$pred(\text{current\_block}) = a \times \text{ref\_block} + b \qquad \text{(Eq. 4)}$$

where current_block is the current block to predict, pred (current_block) is the prediction of the current block, and ref_block is the reference block built with regular motion compensation (MC) process that is used for the temporal prediction of the current block. In a variant, ref_block is a weighted sum of two reference blocks in case of bi-prediction.

Note that the set of neighboring reconstructed and the set of reference samples (see gray samples in FIG. 5) have the same number and same pattern. In the following, we will denote "left samples" the set of neighboring reconstructed (or the set of reference samples) situated at the left of the current block and denote "top samples" the set of neighboring reconstructed (or the set of reference samples) located at the top of the current block. We will denote "samples set" the combination of "left samples" and "top-samples" sets.

Table 1 provides an estimation of the complexity of LIC parameters derivation according to equation 3. The complexity is measured herein as the number of operations required for deriving the LIC parameters. In this table, $N=2^k$ corresponds to the number of reconstructed and reference samples with bit-depth equal to "d". The first column identifies the operations required, the second column measures the number of bits required in memory, the third to sixth columns respectively count the number of sum, multiplication, shift (division by 2) and integer division operations required, and the last line provides the total number of operations required.

TABLE 1

| | memory (bits) | sum | mult | Div (shift) | Div |
|---|---|---|---|---|---|
| Σ cur (r) | d + k | N | | | |
| Σ ref (s) | d + k | N | | | |
| Σ ref (s) × cur (r) | 2d + k | N | N | | |
| Σ cur $(r)^2$ | 2d + k | N | N | | |
| a | | 2 | 2 | 2 | 1 |
| b | | 1 | 1 | 1 | |
| Total | 6d + 4k | 4N + 3 | 2N + 3 | 3 | 1 |

In at least a first embodiment, the LIC parameters calculation process uses the sums of absolute differences (SAD) as formulated in equation 6:

$$a = \left( \frac{\sum \text{abs}\left( cur(r) - \frac{\sum cur(r)}{N} \right)}{\sum \text{abs}\left( ref(s) - \frac{\sum ref(s)}{N} \right)} \right) \qquad \text{(Eq. 6)}$$

$$b = \frac{\sum cur(r)}{N} - a \times \frac{\sum ref(s)}{N}$$

where cur(r) is a neighboring reconstructed sample in current picture (right side of FIG. 5), ref(s) is a reference sample built with motion compensation (translated by a motion vector mv) from reference picture (left side of FIG. 5), and s=r+mv. The neighboring reconstructed samples of the current block (cur(r)) and the reference samples (ref(s)) are co-located relatively to the L-shape through the relation «s=r+mv» as depicted in FIG. 5.

| | memory | sum | mult | Div (shift) | Div |
|---|---|---|---|---|---|
| $\frac{\sum cur(r)}{N}$ | d + k | N | | 1 | |
| $\frac{\sum ref(s)}{N}$ | d + k | N | | 1 | |
| Σ abs(cur(r) − . . . ) | d + k | 2N | | | |
| Σ abs(ref(s) − . . . ) | d + k | 2N | | | |
| a | | | | | 1 |
| b | | 1 | 1 | | |
| Total | 4d + 4k | 6N + 1 | 1 | 2 | 1 |

The result of using the sums of absolute differences for the LIC parameters calculation is clearly much more efficient. Firstly, the memory needs are reduced (column 2). The supplementary additions required are largely compensated by the drastic reduction in terms of multiplications (column 4). Thus, this technique greatly improves the efficiency of the LIC related computations and more generally improves the efficiency of the encoding or decoding.

In a variant embodiment, the parameter a of equation 6 is determined with a regularization term "corr" as formulated in equation 7:

$$a = \left( \frac{\sum \text{abs}\left( cur(r) - \frac{\sum cur(r)}{N} \right) + corr}{\sum \text{abs}\left( ref(s) - \frac{\sum ref(s)}{N} \right) + corr} \right) \qquad \text{(Eq. 7)}$$

In at least one embodiment, the regularization term is defined as formulated in equation 8:

$$corr = \left( \sum \text{abs}\left( cur(r) - \frac{\sum cur(r)}{N} \right) \right) \gg \text{reg\_shift} \qquad \text{(Eq. 8)}$$

where reg_shift takes the value 7 for example.

Figure 6:
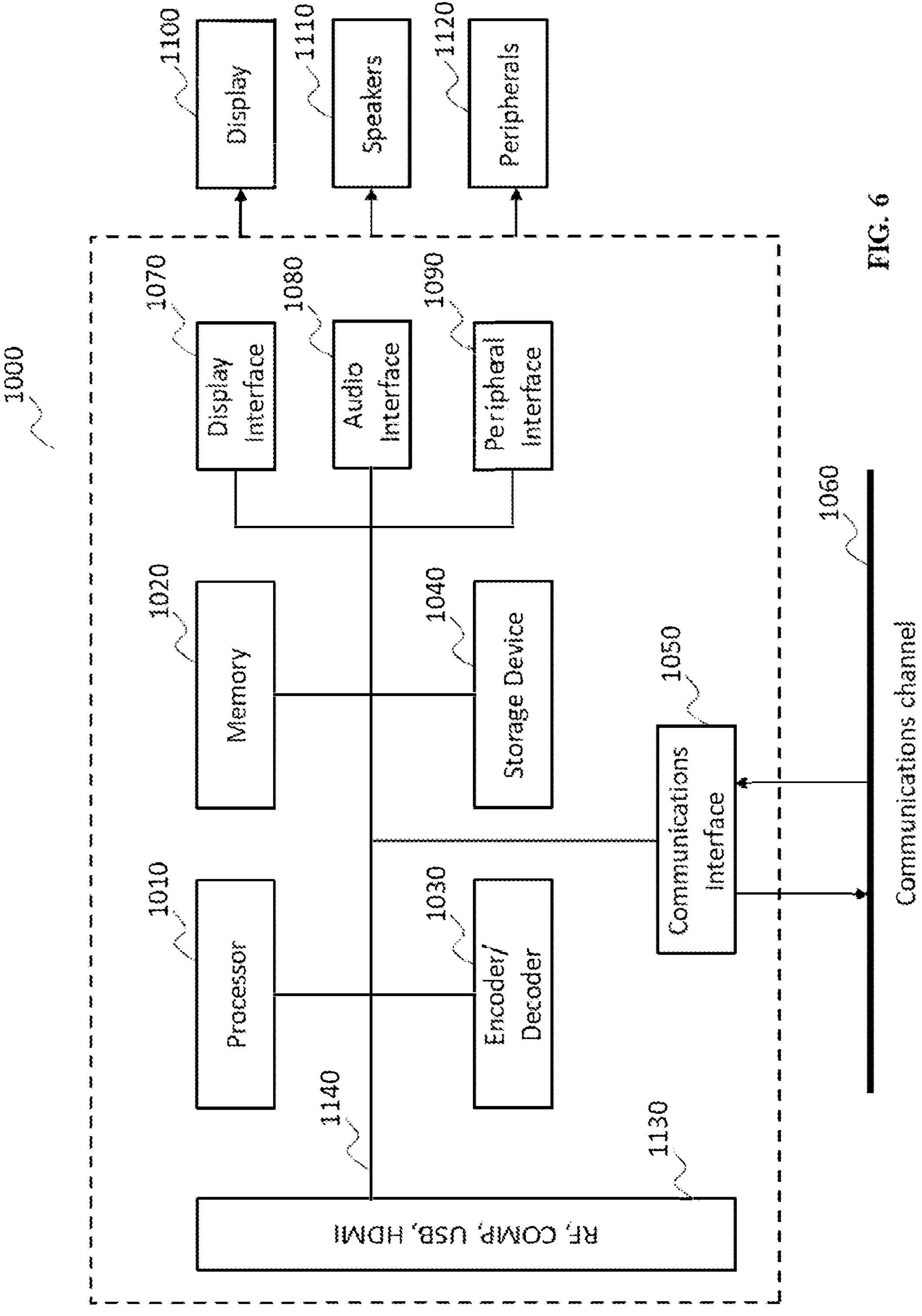
FIG. 6 illustrates a block diagram of an example of a system in which various aspects and embodiments are implemented.

FIG. 6 illustrates a block diagram of an example of a system in which various aspects and embodiments are implemented. System 1000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the 12C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figure 7:
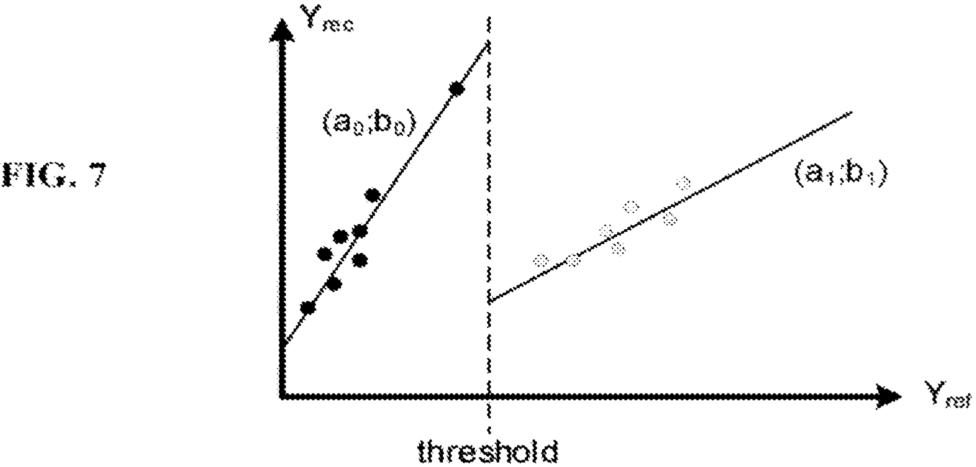
FIG. 7 illustrates an example embodiment of a multi model LIC where the models are split by a threshold.

FIG. 7 illustrates an example embodiment of a multi model LIC where the models are split by a threshold. In such embodiment, two linear models are using distinct LIC parameters ((a0,b0) and (a1,b1)), as shown in FIG. 7 and for example determined using equation 3 described above or using other methods. A first model and first LIC parameters are used for a first subset of the samples and a second model and second LIC parameters are used for the second subset of the samples. In the following, this mode is named multi model LIC (MM-LIC). This embodiment uses two linear models (a0,b0) and (a1,b1) and a threshold regarding reconstructed luma samples values to determine which model to use. The threshold value is for example determined as the average of the reconstructed luma sample values.

Figure 8A:
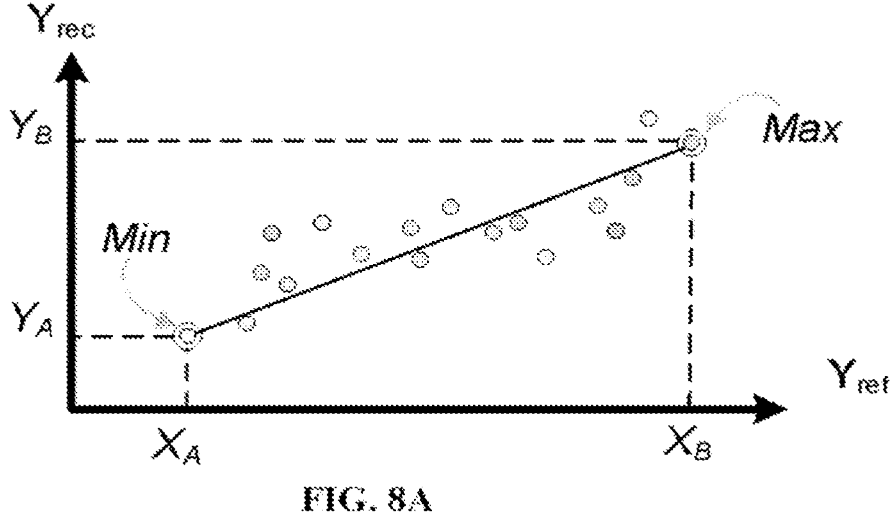
FIG. 8A illustrates an example where a single model is determined according to extreme values.

FIG. 8A illustrates an example where a single model is determined according to extreme values. In this example, the value of "a" is obtained using the two reference samples (XA,XB) with minimal (Min) and maximal (Max) values and the associated reconstructed samples (YA, YB) (Eq. 3b):

$$a = \frac{Y_B - Y_A}{X_B - X_A} \quad \text{(Eq. 3b)}$$

Figure 8B:
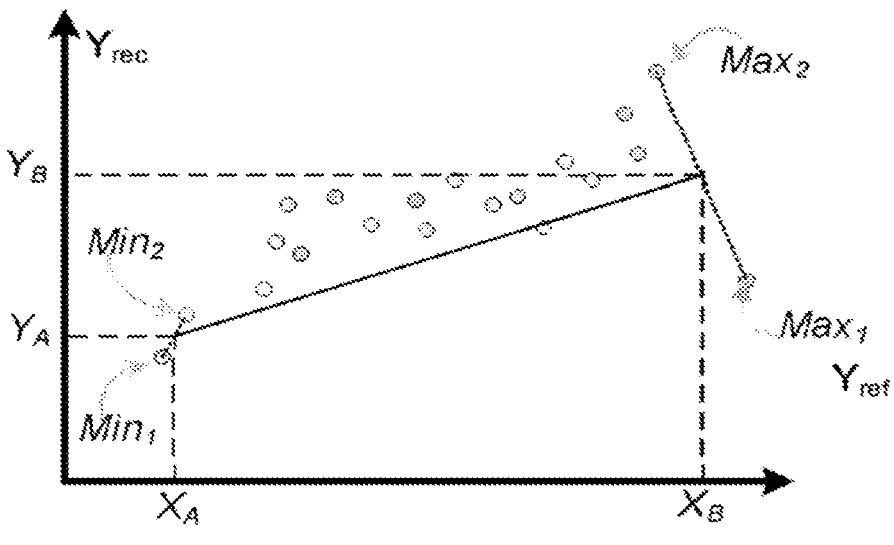
FIG. 8B illustrates another example where a single model is determined according to averaged extreme values.

FIG. 8B illustrates another example where a single model is determined according to averaged extreme values. In this example, the minimum and maximum values are replaced by the average of respectively the two or more smallest or the two or more greatest values. In the example illustrated in the figure, Min1 and Min2 are the two smallest values. These elements are averaged to determine the values of XA and YA. Max1 and Max2 are the two greatest values. These elements are averaged to determine the values of XB and YB. The value of "a" is then determined according these corrected values of XA, XB, YA, YB. This allows to increase the robustness and is particularly efficient in case of outliers, for example due to noise. In the example illustrated, Max1 is clearly an outliner and determining the linear model using only the values of Min1 and Max1 would lead to a model that would not be very accurate.

Figure 9A:
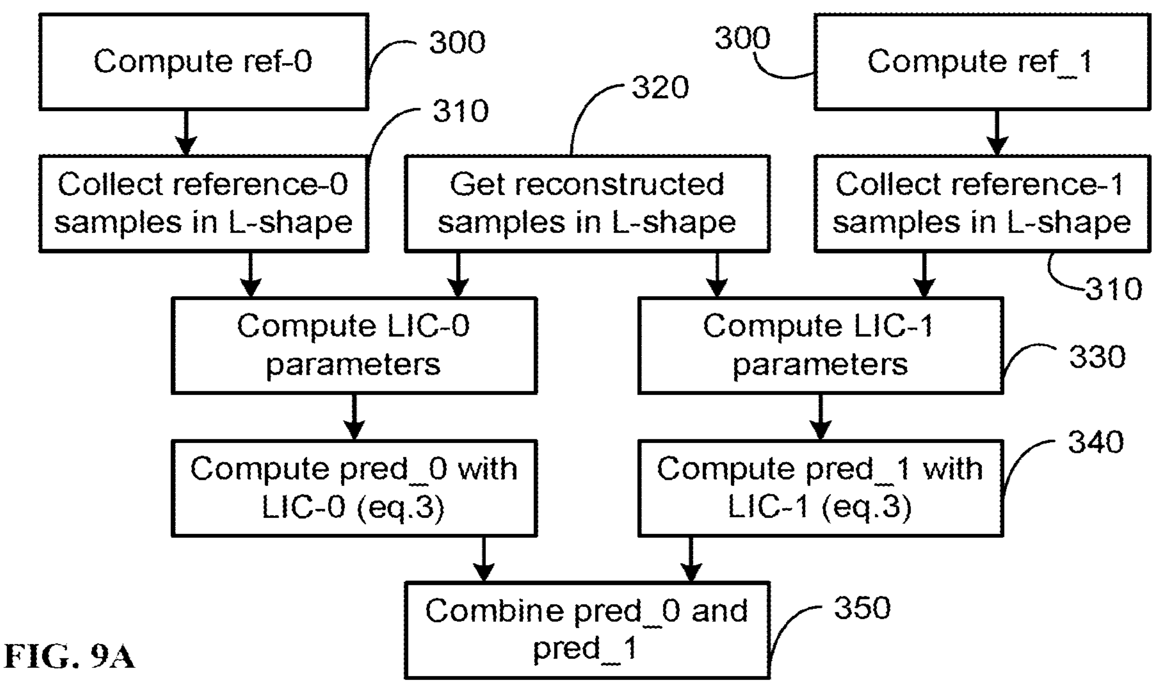
FIG. 9A illustrates a prediction method in case of bi-prediction comprising a first method for derivation of LIC parameters.

FIG. 9A illustrates a prediction method in case of bi-prediction comprising a first method for derivation of LIC parameters. In this case, the prediction is based on two references called reference 0 and reference 1 that are combined together. The LIC process is applied twice, first on reference 0 prediction (LIC-0) and second on the reference 1 prediction (LIC_1). Next, the two predictions are combined together as usual using default weighting (P=(P0+P1+1)>>1) or bi-prediction weighted averaged (BPWA): P=(g0.P0+g1.P1+(1<<(s−1)))>>s). This method is named method-a.

Figure 9B:
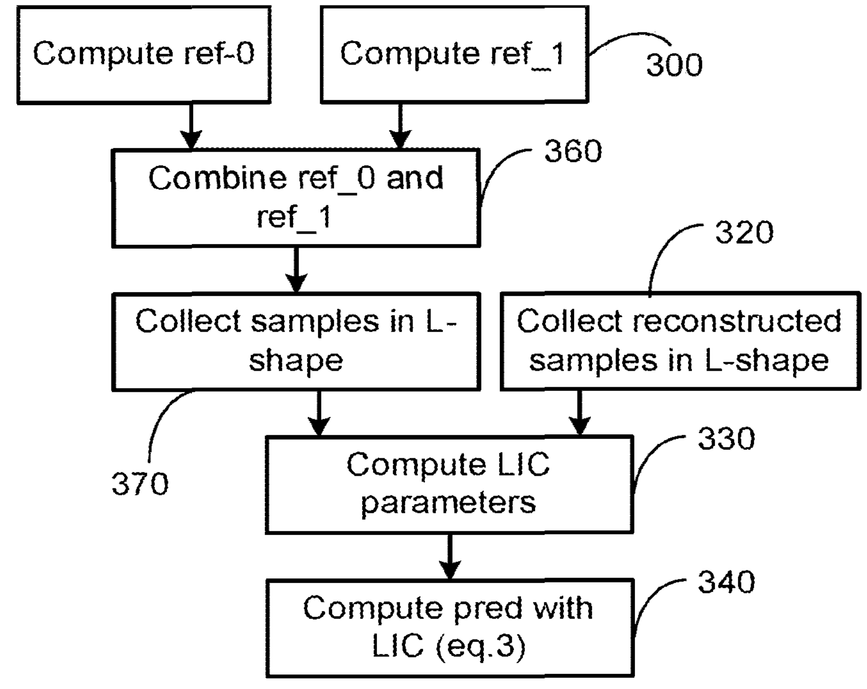
FIG. 9B illustrates a prediction method in case of bi-prediction comprising a second method for derivation of LIC parameters.

FIG. 9B illustrates a prediction method in case of bi-prediction comprising a second method for derivation of LIC parameters. In this variant named method-b, the regular predictions are first combined in step 360. Then, a single LIC process is applied, in step 330 and the prediction is computed in step 340 according to the determined LIC parameters.

Another method of parameters estimation for intra-prediction is named Cross-Component Linear Model (CCLM). the chroma samples block prediction (Ycorr) can be built from the (down-scaled) reconstructed luma samples block (Ypred) corrected with a linear model. In this case, the same model as equation 1 is used with:

Ypred(x) is the reconstructed luma sample value situated at position x,

Ycorr(x) is the prediction of the chroma sample value situated at position x.

The values of (a,b) are estimated based on the minimum and maximum values of the reconstructed luma samples (Minluma, Maxluma) and the minimum and maximum values of the reconstructed chroma samples Ycurr (Minchroma, Maxchroma) of the L-shape as formulated in equation 5:

$$a = ((\text{Max\_chroma} - \text{Min\_chroma}))/((\text{Max\_luma} - \text{Min\_luma})) \quad \text{(Eq. 5)}$$

$$b = \text{Min\_chroma} - a \cdot \text{Min\_luma}$$

As shown in FIG. 7, to improve the LIC, two different LIC models can be used, with distinct LIC parameters ((a0,b0) and (a1,b1)) determined for example using equation 3 or 3b as shown in FIG. 8A or 8B. A first model and first LIC parameters are used for a first subset of the samples and a second model and second LIC parameters are used for the second subset of the samples. The split between the two sets is done regarding a threshold value.

Figure 10A:
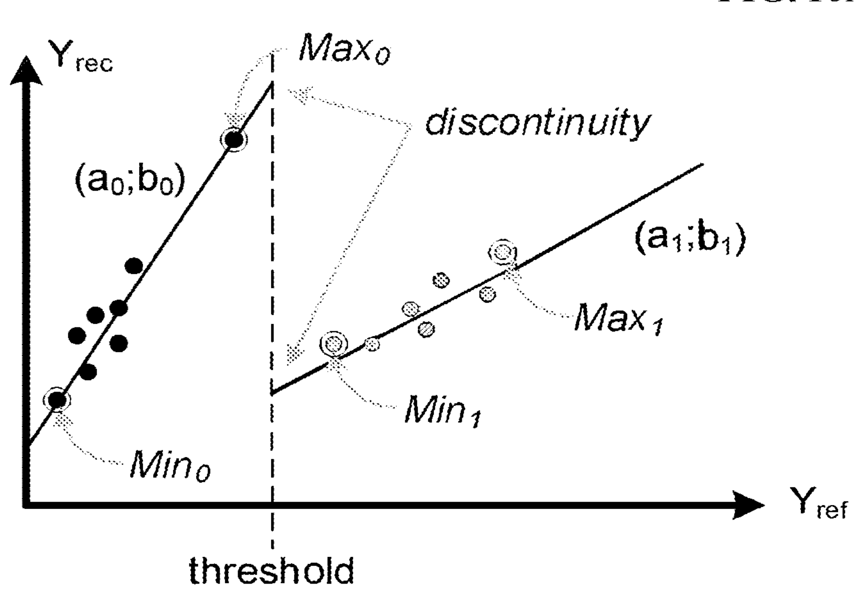
FIG. 10A illustrates an example of multi model discontinuity issue.

FIG. 10A illustrates an example of multi model discontinuity issue. This is the case where the models are discontinuous, in other word, when the two lines generated by the two models ((a0; b0) and (a1; b1)) do not intersect at threshold. This discontinuity issue may induce visual artefacts and/or reduce the coding efficiency and should be prevented.

Figure 10B:
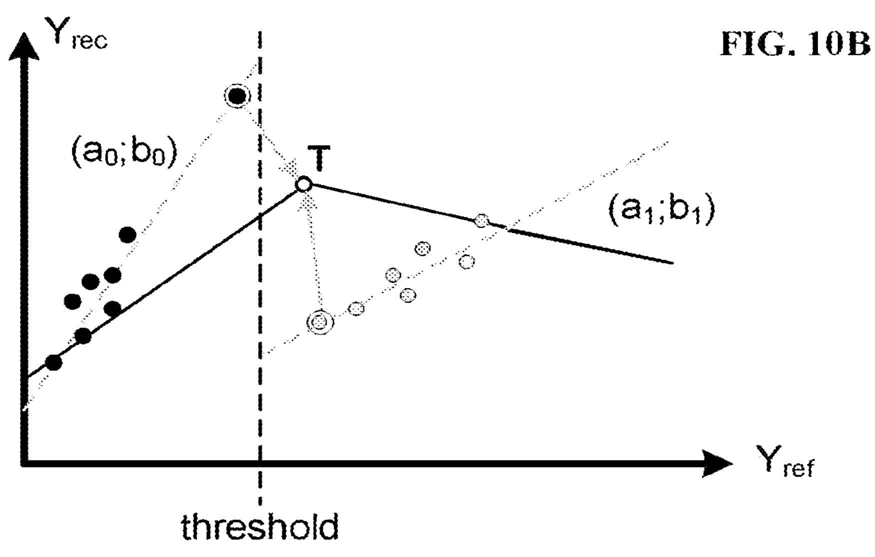
FIG. 10B illustrates a first example of technique to solve the multi model discontinuity issue in case the models are built as the line going through the (Min;Max) points of each subset.

FIG. 10B illustrates a first example of technique to solve the multi model discontinuity issue in case the models are built as the line going through the (Min;Max) points of each subset. The correction is done by replacing Max0 and Min1 by the average between former Max0 and Min1 (point T in the figure) and determining the LIC parameters of the two models using these corrected values. This prevents the discontinuity since the maximal value of first model is equal to the minimal value of the second model (equals T in the figure).

At least one issue faced by the LIC is that the derivation of the LIC parameters is based on a relatively small number of samples compared to the current block size. Additionally, these samples are not co-located with the current block, so that they can be poor estimation of the local illumination change. Moreover, the LIC parameters estimation also depends on the method used to derive (a,b). For example, in case of equation 3, some inconsistency in the value of "a" may occur if the denominator is low. In another example, inconsistency in the value of "a" may occur if the numerator is low. This is typically the case for example when the distribution of ref(s) or cur(r) is narrow. Therefore, in some situations, the derivation of the LIC parameters comprises some uncertainty. To reduce this uncertainty a regularization process is inserted in the prediction stage so that potential problems are detected and LIC parameters are corrected accordingly to prevent visual artefacts and/or improve coding efficiency.

Figure 11:
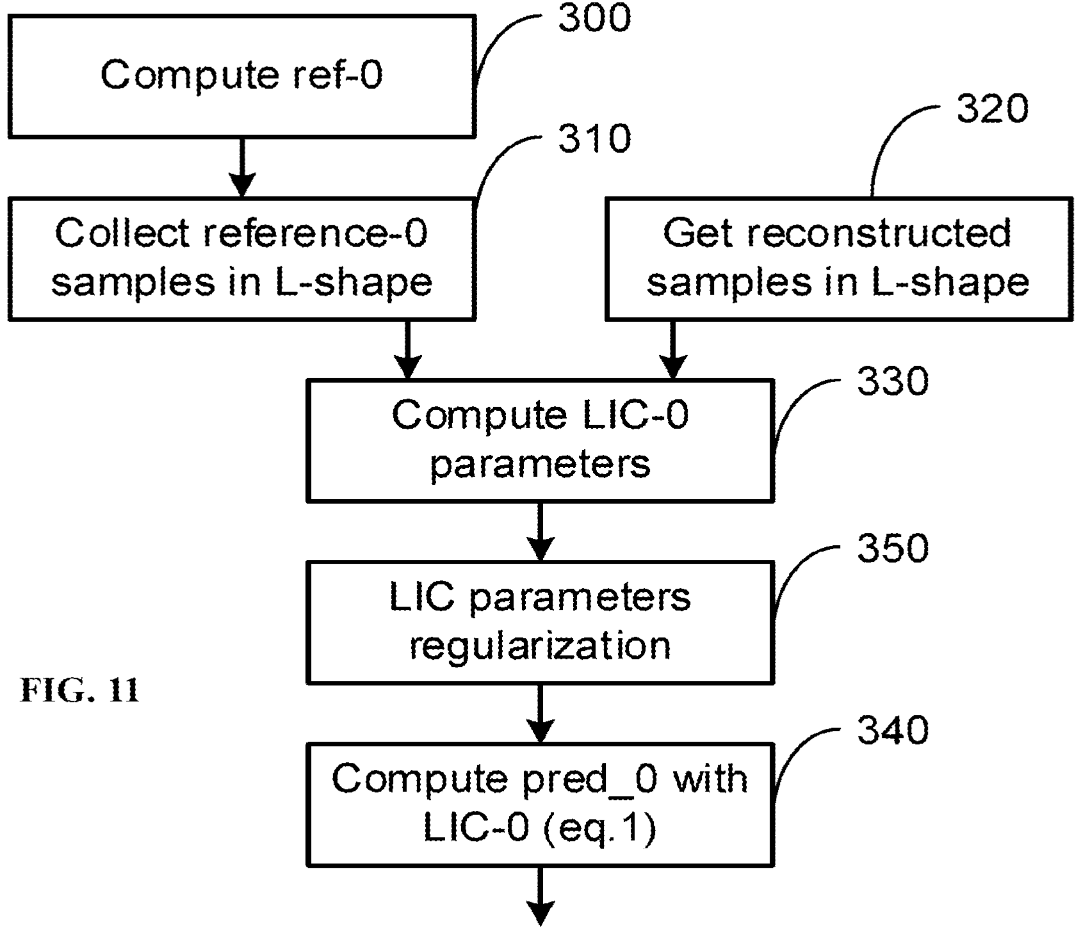
FIG. 11 illustrates an example embodiment of LIC comprising a regularization step.

FIG. 11 illustrates an example embodiment of LIC comprising a regularization step. In such embodiment, the overall principles including the LIC parameters derivation (330) are unchanged but a regularization function is applied in step 350, once the LIC parameters have been computed in order to potentially correct the previously determined LIC parameters. Such regularization or correction is particularly required when the derivation of the LIC parameters is uncertain, in other words, when the level of confidence in the determined LIC parameters is too low.

FIG. 12 illustrates a regularization function where the parameters are adjusted when being outside a given range. In this variant embodiment, the values (a,b) are adjusted if "a" and/or "b" exceed some pre-defined thresholds (th_a, th_b) around the default (1,0) values. For example: th_a=0.25 and th_b=100 for 10-bits samples. In at least one embodiment, the pre-defined thresholds th_a and th_b are equally distributed around the default value equal of 1.0.

In at least an embodiment:

$$\text{if } (a < 1 - \text{th\_a}) \text{ or } (a > 1 + \text{th\_a}) \text{ then "}a\text{" is adjusted.}$$

$$\text{if } (b < -\text{th\_b}) \text{ or } (b > \text{th\_b}) \text{ then "}b\text{" is adjusted.}$$

In a variant, the thresholds are not equally distributed around the default (1,0) values:

$$\text{if } (a < 1 - \text{th\_a1}) \text{ or } (a > 1 + \text{th\_a2}) \text{ then "}a\text{" is adjusted.}$$

$$\text{if } (b < -\text{th\_b1}) \text{ or } (b > \text{th\_b2}) \text{ then "}b\text{" is adjusted.}$$

In at least an embodiment, the regularization function provides an adjustment of the parameters when being outside a given range. In such embodiment, parameter a is adjusted first and b is determined according to equation 1. Indeed, relating to equation 1, the derivation of LIC parameters is based on property r1:

$$DCrec = a \cdot DCref + b \quad \text{(r1)}$$

where DCrec is the average of reconstructed samples and DCref is the average of the reference samples. Therefore, in this embodiment:

$$\text{if } ((b > \text{th\_b}) \ \&\& \ (a < 1 - \text{th\_a})) \text{ then "}a\text{" is set to "}1 - \text{th\_a" and "}b\text{" is computed with (r1).}$$

$$\text{if } ((b < -\text{th\_b}) \ \&\& \ (a > 1 + \text{th\_a})) \text{ then "}a\text{" is set to "}1 + \text{th\_a" and "}b\text{" is computed with (r1) and thus } b = DCrec - a \cdot DCref.$$

In at least another embodiment, property (r1) is also verified with the adjusted values (a+da, b+db):

$$DCrec = (a + da).DCref + (b + db) \quad \text{(r2)}$$

Given (r1), (r2) becomes:

$$da = -db/DCref \quad \text{(r3)}$$

According to this embodiment, a is adjusted to (a+da) and b is adjusted to (b+db), the adjustment "da" being explicitly computed with (r3) and "db" determined as:

$$\text{if } (b < -\text{th\_b}) \text{ then } db = -\text{th\_b} - b$$

$$\text{if } (b > \text{th\_b}) \text{ then } db = \text{th\_b} - b$$

These regularization adjustments ensure that the LIC parameters are compliant with a certain range of values and thus, that the prediction step behaves correctly since in good conditions.

In at least an embodiment, the values of "th_a" and/or "th_b" are coded in the bitstream. For examples, they can be coded in sequence header, picture header, slice header or tile header. In another embodiment, they are fixed or associated with some profile and/or level.

In at least another embodiment, the values of "th_a" and/or "th_b" are function of at least a parameter (or set of parameters) P and may be obtained from the bitstream using the decoding process. For example, P can include the Picture Order Count (POC) distance between the current picture (POCcur) and the reference picture (POCref).

For example:

$$th\_a = 0.25 \times (1 + 0.25 \times \mathrm{abs}(POCcur - POCref))$$

or:

$$th\_a = 0.25 \times (1 + 0.25 \times \min(4; \mathrm{abs}(POCcur - POCref)))$$

In another example, the parameter P includes the temporal depth of the current picture. FIG. 13 shows the temporal depth that is related to the hierarchical picture coding principles.

In at least an embodiment, the parameter P includes the number of samples of the L-shape actually used for estimating the LIC model (e.g. numValid). In this case, the value of "th_a" and/or "th_b" are function of P.

For example:

$$\text{if } (numValid < Nc)$$

$$th\_a = th\_a1 \text{ and } th\_b = th\_b1$$

$$\text{else}$$

$$th\_a = th\_a2 \text{ and } th\_b = th\_b2$$

wherein for example th_a1=0.3, th_a2=0.4, th_b1=0, th_b2=80 and Nc is a threshold of confidence. This threshold can be different in Luma than in Chroma since the number of samples is different. In one example, a threshold of 32 is used for Luma and 16 for Chroma. In a variant, NC is a function of the current block size, for example NC=0.5×(blockWidth+blockHeight).

In this embodiment, a low value for numValid indicates a reduced number of samples and thus implies a low confidence in the validity of the LIC model.

In the case of multi-model LIC, multiple regularization processes are required: one for each model (elements 350 in FIG. 14) since each individual model of a multi model LIC is independent from the others.

FIG. 14 illustrates an example embodiment of regularization to handle multi-model LIC. As introduced above, two different LIC models can be used and may lead to discontinuity issue. In step 380, a correction process is added to ensure the continuity of the multiple models. This process can be implemented succeeding directly the regularization process.

In at least an embodiment, the correction process (380) is applied in merge mode only. Indeed, when the encoder detects a multi model discontinuity issue, LIC is disabled can be for one block. This is performed by encoding LIC flag to false for this block. However, in merge mode, the LIC flag is inherited from another neighboring block and the encoder has less flexibility to avoid this issue unless to re-encode recursively previous blocks.

In at least an embodiment, the correction process (380) is applied if the discontinuity size is superior to a discontinuity threshold (DT).

In at least an embodiment, the correction process (380) is applied in merge mode only and if the discontinuity size is superior to DT.

Figure 15A:
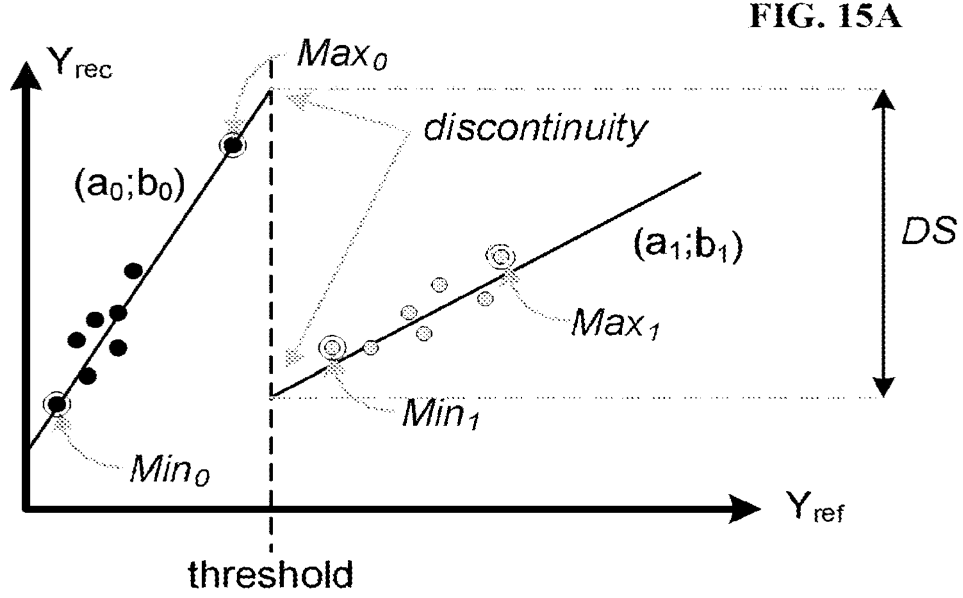
FIG. 15A illustrates a method for determining the discontinuity between two LIC models.

The discontinuity size (DS) can computed by the decoder in different ways:

- as the distance between the values at the crossing between each of the linear models with the threshold line as depicted in FIG. 15A for example
- as the difference between the largest value for the first model M0 and the smallest value of the second model M1. DS=Max0−Min1

The value of the discontinuity threshold DT can be implicitly known by the decoder, coded in the bit-stream, computed from other decoded parameters or obtained by other means.

Figure 15B:
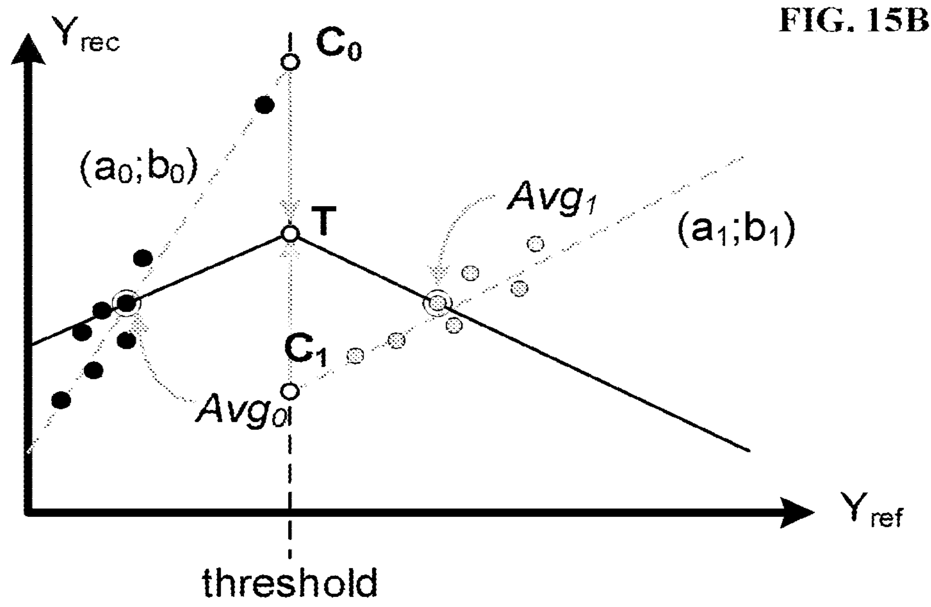
FIG. 15B illustrates a method for correcting the LIC models according to at least one embodiment that ensures the continuity of the multiple models.

In at least an embodiment and as illustrated in FIG. 15B, the correction step 380 of FIG. 8 operates as follows:

- Compute C0 and C1 as the values respectively given by the models M0 and M1 for Yref="threshold",
- Compute T as the average between these two values: T=(C0+C1)/2,
- Correct M0 and M1 as the line going through (Avg0;T) and (T;Avg1), where Avg0 and Avg1 are the average of samples values below and above threshold respectively.

In a variant embodiment of former embodiment, M0 and M1 are corrected as the line going through (Min0;T) and (T;Max1), where Min0 is the smallest value of samples related to the first model M0 and Max1 is the greatest value of samples related to the second model M1.

Figures 16, 17:
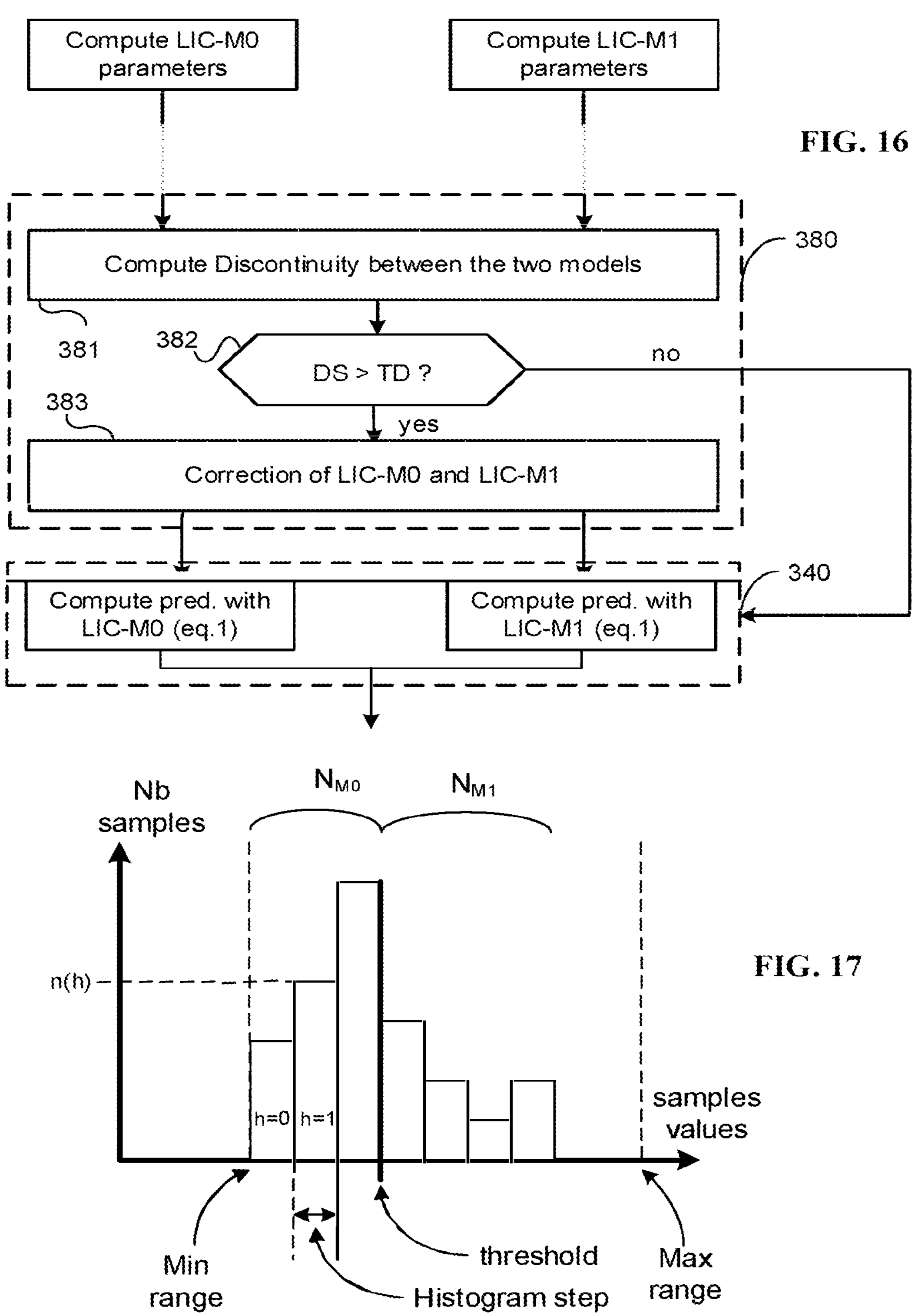
FIG. 16 illustrates an example of block diagram of a multi model LIC parameters correction.
FIG. 17 illustrates an example embodiment for splitting the two LIC models.

FIG. 16 illustrates an example of block diagram of a multi model LIC parameters correction. This element corresponds to block 380 of FIG. 8. Firstly, in step 381, the discontinuity size DS is computed between the two modes. Then, in step 382, this discontinuity size DS is compared to the discontinuity threshold DT. When DS>DT (branch "yes"), then a discontinuity issue has been detected. In this case, the third step 383 comprises correcting the LIC parameters of both models using one of the embodiments described above. When no discontinuity is detected (branch "no"), the LIC parameters are not corrected. Then, in step 340, the prediction is performed with the LIC parameters of both models.

FIG. 17 illustrates an example embodiment for splitting the two LIC models. In such embodiment, two linear models are using distinct LIC parameters ((a0,b0) and (a1,b1)), as shown in FIG. 7 and for example determined using equation 3 or using other methods. A first model and first LIC parameters are used for a first subset of the samples and a second model and second LIC parameters are used for the second subset of the samples. In the following, this mode is named multi model LIC (MM-LIC).

The split between the two sets is done regarding a threshold value. In FIG. 6, NM0 and NM1 respectively denote the number of reconstructed neighboring samples with value respectively inferior and superior to the threshold.

Determining the threshold value splitting the two models can be performed according to various embodiments.

In at least one embodiment, the threshold value splitting the two models is for example determined as the average of the reconstructed samples ("cur(s)").

In at least one embodiment, the threshold value is determined so that so that the number of samples used in each model (NM0 and NM1) is substantially the same. This increases the validity of the LIC models. Indeed, when the number of samples of one of the model is too small (NM0 much greater than NM1 or NM0 much smaller NM1), the validity of the corresponding LIC model (NM1 or NM0 respectively) is uncertain and the LIC parameters derived using equation 3 could be unreliable since based on too few samples. This can be done using a histogram as shown in FIG. 6 and counting the number of samples. In a variant, this embodiment should be used only if the size of the histogram ($2^{bit\text{-}depth-s}$) is smaller than N=NM0+NM1.

In an alternative embodiment, when the number of samples of the models is not well balanced, a single LIC model is used. This can be determined by dividing the number of samples of the model that has the highest number of samples by the number of samples of the other model. If the ratio is greater than a threshold, then the model is considered as not well balanced and, in this case, a single linear model is used. An example of threshold value is 10. In another example, this can be determined if one number of samples is inferior to a pre-determined value (e.g. NMi=4 samples).

In at least one embodiment, memory savings are achieved by using a histogram buffer size smaller than the reconstructed samples range value (e.g. $0 \ldots 2^{bit\text{-}depth}$). This is done by using an appropriate scaling factor "s" that corresponds to right shifting of the sample values for instance. In that case, the histogram buffer size is reduced to 2 bit-depth-s and the histogram step size is $2^s$ and thus, saving memory.

In a variant embodiment, the lowest and highest values of the histogram are saturated. This is illustrated by the values Min range and Max range in the figure. All sample values smaller than Min range are set to Min range and all sample values higher than Max range are set to Max range. When knowing the potential range of the threshold, only a rough distribution is needed around the probable threshold value, allowing to save some memory. For instance, an estimation of the samples values ranges may be inferred from previously coded samples, in the same or previously coded pictures, or the range values may be encoded in the bit-stream.

In at least an embodiment, a single pass on the data is performed by aggregating partial sums on the histogram:

$$\sum \text{abs}\left(cur(r) - \frac{\sum cur(r)}{N}\right)$$

are computed with the same intervals of values as the histogram. Once values such as $$\frac{\sum cur(r)}{N}, \frac{\sum ref(r)}{N}$$

are computed and the threshold is chosen, partial sums are accumulated with histogram values, so that there is no need to loop again on ref and cur values. This corresponds to an approximation of the sum of absolute difference as:

$$\sum_{h \in H} n_{cur}(h) \cdot \text{abs}\left(h \cdot 2^s - \frac{\sum cur(r)}{N}\right)$$

where $n_{cur}(h)$ is the number of reconstructed cur samples with value ∈[h.2s;(h+1).2s[and H={h0, h1 . . . } is the number of histogram values. The same approximation can be applied to the reference samples. This single pass is particularly interesting when the LIC parameters a and b are not obtaining using a least square minimization (LSM) as formulated in equation 3 but by using sums of absolute differences (SAD) as formulated in equation 6a:

$$a = \left(\frac{\sum \text{abs}\left(cur(r) - \frac{\sum cur(r)}{N}\right)}{\sum \text{abs}\left(ref(s) - \frac{\sum ref(s)}{N}\right)}\right) \quad \text{(Eq. 6a)}$$

$$b = \frac{\sum cur(r)}{N} - a \times \frac{\sum ref(s)}{N}$$

where cur(r) is a neighboring reconstructed sample in current picture (right side of FIG. 3C), ref(s) is a reference sample built with motion compensation (translated by a motion vector mv) from reference picture (left side of FIG. 3C), and s=r+mv. The neighboring reconstructed samples of the current block (cur(r)) and the reference samples (ref(s)) are co-located relatively to the L-shape through the relation «s=r+mv» as depicted in FIG. 3C.

This embodiment is also applicable when the LIC parameters a and b are obtained using a least square minimization (LSM). The sum terms of the two models are simply added to obtain the sum terms of the single model.

Figure 18:
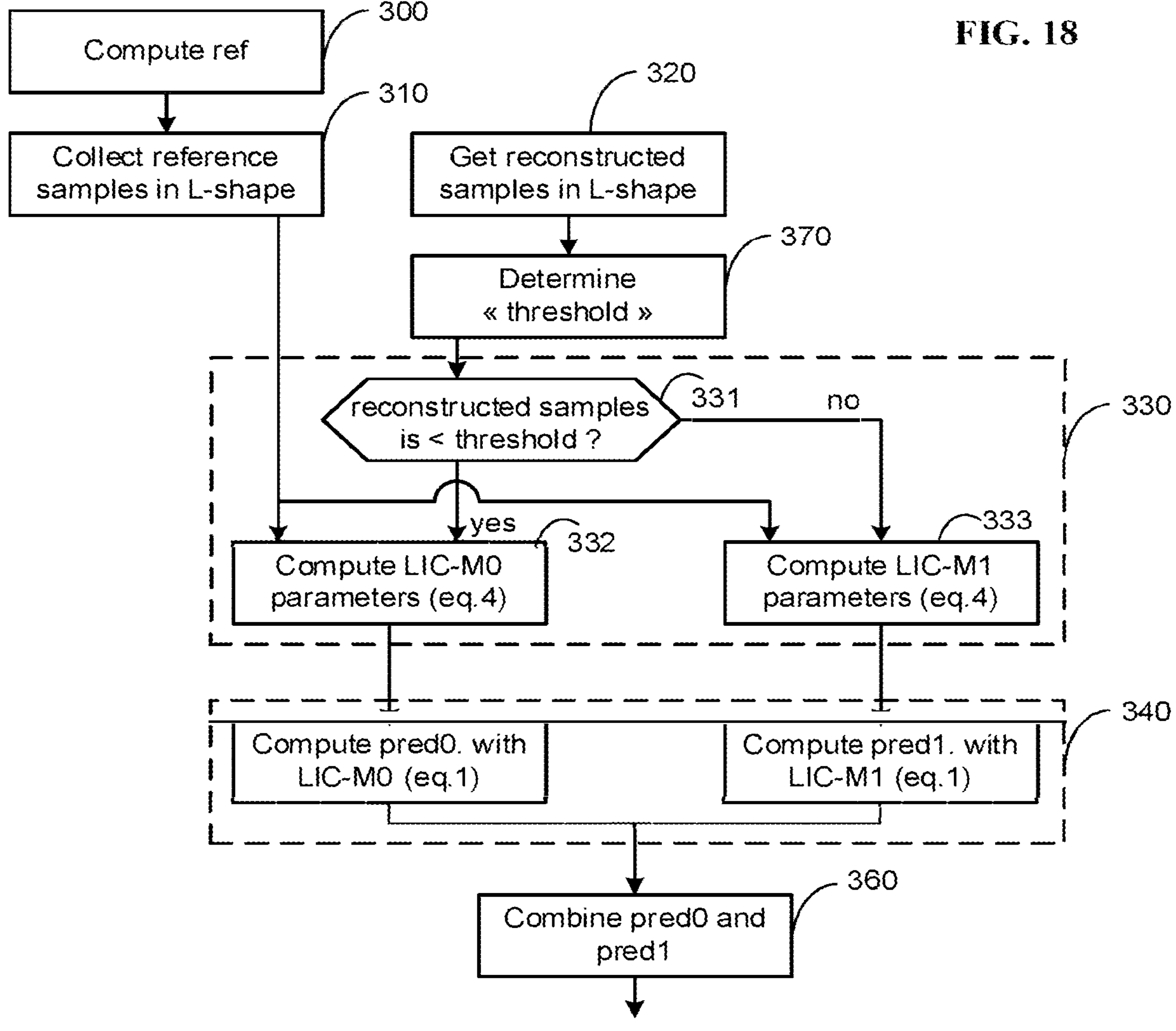
FIG. 18 illustrates a method for derivation of LIC parameters using two LIC models.

FIG. 18 illustrates a method for derivation of LIC parameters using two LIC models. In this method, once the threshold is determined from the histogram in step 370, the value of a reconstructed sample is compared to the threshold, in step 330, to determine if this reconstructed sample will be used to determine the LIC parameters for the first LIC model or for the second LIC model. The corresponding LIC parameters are then determined for both models and the predictions are computed with both models, in step 340. These predictions are then combined (in step 360) for example are combined together using a simple average or a bi-prediction weighted average.

In at least one embodiment, the multi model discontinuity issue is detected by the encoder and the LIC feature may be disabled by the encoder for the block where the multi model discontinuity happen. This can be signaled by the encoder by encoding the LIC flag to false for this block. However, in merge mode, the LIC flag is inherited from another neighboring block and the encoder has less flexibility to avoid this issue unless to re-encode recursively previous blocks.

In at least one embodiment, in case of multi model discontinuity for a block coded in merge mode, the encoder does not use MM-LIC but uses a single LIC model.

In a variant embodiment, a discontinuity size (DS) is computed by the decoder and if DS is superior to a discontinuity threshold value, then the single LIC model method is selected, else Multi-Model LIC model is used. The discontinuity threshold is implicitly known by the decoder or is coded in the bit-stream or is computed from other decoded parameters or obtained using other means.

Figure 19:
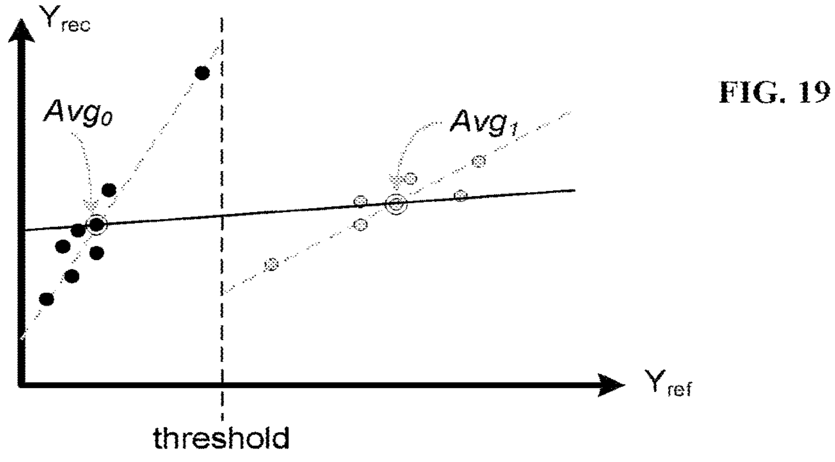
FIG. 19 illustrates an example embodiment for determining single model parameters when a discontinuity issue occurs.

FIG. 19 illustrates an example embodiment for determining single model parameters when a discontinuity issue occurs. In this embodiment corresponding to the case where a single LIC model method is selected due to a discontinuity issue, the LIC parameters for a single model are directly derived from the average values of samples below and above the threshold that splits the two models (Avg0 and Avg1 respectively). This has the advantage to derive efficiently the parameters of the single model in a simple way without requiring to re-scan the samples and without computing again equations 6a since the average values Avg0 and Avg1 have already been computed.

Figure 20:
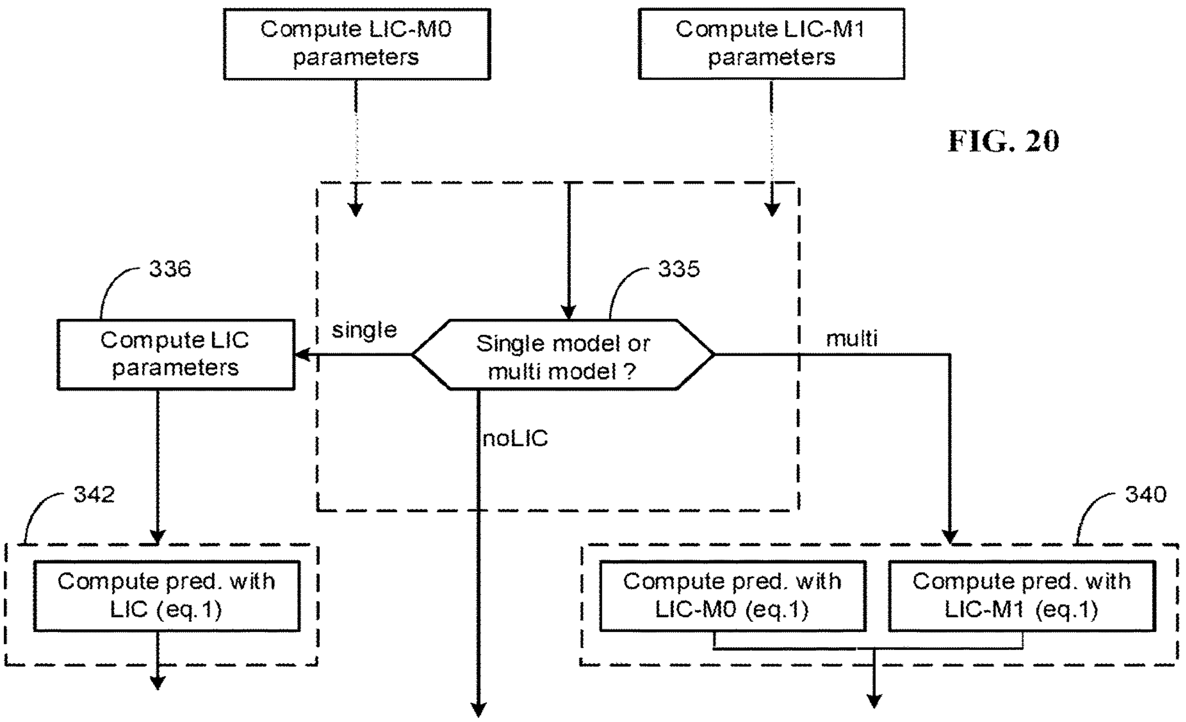
FIG. 20 illustrates an example embodiment of decision process.

FIG. 20 illustrates an example embodiment of decision process according to one embodiment. This process aims at deciding whether the LIC uses a single linear model or multiple linear models. Firstly, the LIC parameters are determine for the case where two models are used. Then, in step 335, a decision is taken to decide if LIC should be used and which model to use. The decision is taken according the different elements described above (unbalanced number of samples, discontinuity issues). When a single model should be used, then the LIC parameters are determined in step 336 for the single model for example using the method illustrated in FIG. 9B and the block prediction is performed in step 342. When the decision is to select multi model LIC, then the computed LIC parameters for both models are used in step 340 to perform the block prediction.

The decision whether the LIC uses a single linear model or multiple linear models is valid for both the encoder and the decoder but the decision of not using LIC is only valid at the encoder side.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment. Additionally, this application or its claims may refer to "determining" various pieces of information. Determining the information may include one or more of, for example, estimating the information, calculating the information, predicting the information, or retrieving the information from memory. Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for decoding picture data for at least one block in a picture, the method comprising:

determining a first set of local illumination compensation (LIC) parameters of a first LIC model based on a first set of reconstructed samples in an L-shape associated with the at least one block and a second set of local illumination compensation parameters of a second LIC model based on a second set of reconstructed samples in the L-shape, wherein the first set of reconstructed samples comprises reconstructed samples below a first value and the second set of reconstructed samples comprises reconstructed samples above the first value;

determining a predictor for the at least one block responsive to the determining; and reconstructing the at least one block based on the predictor.

2. The method of claim 1, wherein determining the predictor for the at least one block responsive to the determining comprises disabling local illumination compensation in a case where a discontinuity greater than a second value is determined between the first set of local illumination compensation parameters and the second set of local illumination compensation parameters.

3. The method of claim 1, wherein determining the predictor for the at least one block responsive to the determining comprises determining a predictor based on a single set of local illumination compensation parameters in a case where a discontinuity greater than a third value is determined between the first set of local illumination compensation parameters and the second set of local illumination compensation parameters or in a case where a ratio between a number of samples of the set of reconstructed samples with highest number of samples and a number of samples of the other set of reconstructed samples is greater than a fourth value.

4. The method of claim 3, wherein the local illumination compensation parameters of the single set are determined based on an average value of the first set of reconstructed samples and an average value of the second set of reconstructed samples.

5. The method of claim 1, wherein in a case where a discontinuity greater than a second value is determined between the first set of local illumination compensation parameters and the second set of local illumination compensation parameters, the method comprises correcting the first set of local illumination compensation parameters and the parameters the second set of local illumination compensation parameters based on a value obtained for the first value by the first LIC model and a value obtained for the first value by the second LIC model.

6. The method of claim 1, wherein the first value is equal to an average value of the reconstructed samples in the L-shape.

7. The method of claim 1, wherein the first value is determined so that a number of reconstructed samples in the first set and a number of reconstructed samples in the second set are substantially the same.

8. An apparatus for decoding picture data for at least one block in a picture, the apparatus comprising one or more processors and at least one memory coupled to said one or more processors, wherein said one or more processors are configured to perform:

determining a first set of local illumination compensation (LIC) parameters of a first LIC model based on a first set of reconstructed samples in an L-shape associated with the at least one block and a second set of local illumination compensation parameters of a second LIC model based on a second set of reconstructed samples in the L-shape, wherein the first set of reconstructed samples comprises reconstructed samples below a first value and the second set of reconstructed samples comprises reconstructed samples above the first value;

determining a predictor for the at least one block responsive to the determining; and reconstructing the at least one block based on the predictor.

9. The apparatus of claim 8, wherein determining the predictor for the at least one block responsive to the determining comprises disabling local illumination compensation in a case where a discontinuity greater than a second value is determined between the first set of local illumination compensation parameters and the second set of local illumination compensation parameters.

10. The apparatus of claim 8, wherein determining the predictor for the at least one block responsive to the determining comprises determining a predictor based on a single set of local illumination compensation parameters in a case where a discontinuity greater than a third value is determined between the first set of local illumination compensation parameters and the second set of local illumination compensation parameters or in a case where a ratio between a number of samples of the set of reconstructed samples with highest number of samples and a number of samples of the other set of reconstructed samples is greater than a fourth value.

11. The apparatus of claim 10, wherein the local illumination compensation parameters of the single set are determined based on an average value of the first set of reconstructed samples and an average value of the second set of reconstructed samples.

12. The apparatus of claim 8, wherein in a case where a discontinuity greater than a second value is determined between the first set of local illumination compensation parameters and the second set of local illumination compensation parameters, the one or more processors being configured to perform correcting the first set of local illumination compensation parameters and the second set of local illumination compensation parameters based on a value obtained for the first value by the first LIC model and a value obtained for the first value by the second LIC model.

13. The apparatus of claim 8, wherein the first value is equal to an average value of the reconstructed samples in the L-shape.

14. The apparatus of claim 8, wherein the first value is determined so that a number of reconstructed samples in the first set and a number of reconstructed samples in the second set are substantially the same.

15. A method for encoding picture data for at least one block in a picture, the method comprising:

determining a first set of local illumination compensation (LIC) parameters of a first LIC model based on a first set of reconstructed samples in an L-shape associated with the at least one block and a second set of local illumination compensation parameters of a second LIC model based on a second set of reconstructed samples in the L-shape, wherein the first set of reconstructed samples comprises reconstructed samples below a first value and the second set of reconstructed samples comprises reconstructed samples above the first value;

determining a predictor for the at least one block responsive to the determining; and encoding the at least one block based on the predictor.

16. The method of claim 15, wherein determining the predictor for the at least one block responsive to the determining comprises disabling local illumination compensation in a case where a discontinuity greater than a second value is determined between the first set of local illumination compensation parameters and the second set of local illumination compensation parameters.

17. The method of claim 15, wherein determining the predictor for the at least one block responsive to the determining comprises determining a predictor based on a single set of local illumination compensation parameters in a case where a discontinuity greater than a third value is determined between the first set of local illumination compensation parameters and the second set of local illumination compensation parameters or in a case where a ratio between a number of samples of the set of reconstructed samples with highest number of samples and a number of samples of the other set of reconstructed samples is greater than a fourth value.

18. The method of claim 17, wherein the local illumination compensation parameters of the single set are determined based on an average value of the first set of reconstructed samples and an average value of the second set of reconstructed samples.

19. The method of claim 15, wherein in a case where a discontinuity greater than a second value is determined between the first set of local illumination compensation parameters and the second set of local illumination compensation parameters, the method comprises correcting the first set of local illumination compensation parameters and the second set of local illumination compensation parameters based on a value obtained for the first value by the first LIC model and a value obtained for the first value by the second LIC model.

20. The method of claim 15, wherein the first value is equal to an average value of the reconstructed samples in the L-shape.

21. The method of claim 15, wherein the first value is determined so that a number of reconstructed samples in the first set and a number of reconstructed samples in the second set are substantially the same.

22. An apparatus for encoding picture data for at least one block in a picture, the apparatus comprising one or more processors and at least one memory coupled to said one or more processors, wherein said one or more processors are configured to perform:

determining a first set of local illumination compensation (LIC) parameters of a first LIC model based on a first set of reconstructed samples in an L-shape associated with the at least one block and a second set of local illumination compensation parameters of a second LIC model based on a second set of reconstructed samples in the L-shape, wherein the first set of reconstructed samples comprises reconstructed samples below a first value and the second set of reconstructed samples comprises reconstructed samples above the first value;

determining a predictor for the at least one block responsive to the determining; and encoding the at least one block based on the predictor.

23. The apparatus of claim 22, wherein determining the predictor for the at least one block responsive to the determining comprises disabling local illumination compensation in a case where a discontinuity greater than a second value is determined between the first set of local illumination compensation parameters and the second set of local illumination compensation parameters.

24. The apparatus of claim 22, wherein determining the predictor for the at least one block responsive to the determining comprises determining a predictor based on a single set of local illumination compensation parameters in a case where a discontinuity greater than a third value is determined between the first set of local illumination compensation parameters and the second set of local illumination compensation parameters or in a case where a ratio between a number of samples of the set of reconstructed samples with highest number of samples and a number of samples of the other set of reconstructed samples is greater than a fourth value.

25. The apparatus of claim 24, wherein the local illumination compensation parameters of the single set are determined based on an average value of the first set of reconstructed samples and an average value of the second set of reconstructed samples.

26. The apparatus of claim 22, wherein in a case where a discontinuity greater than a second value is determined between the first set of local illumination compensation parameters and the second set of local illumination compensation parameters, the one or more processors being configured to perform correcting the first set of local illumination compensation parameters and the second set of local illumination compensation parameters based on a value obtained for the first value by the first LIC model and a value obtained for the first value by the second LIC model.

27. The apparatus of claim 22, wherein the first value is equal to an average value of the reconstructed samples in the L-shape.

28. The apparatus of claim 22, wherein the first value is determined so that a number of reconstructed samples in the first set and a number of reconstructed samples in the second set are substantially the same.

* * * * *